US009834450B2

(12) United States Patent
Ishihara et al.

(10) Patent No.: US 9,834,450 B2
(45) Date of Patent: Dec. 5, 2017

(54) DISPERSION LIQUID OF FINE PARTICLES OF CORE-SHELL TYPE INORGANIC OXIDE, METHOD FOR PRODUCING THE DISPERSION LIQUID, AND COATING COMPOSITION CONTAINING THE DISPERSION LIQUID

(75) Inventors: Yoichi Ishihara, Kitakyushu (JP); Toshiharu Hirai, Kitakyushu (JP)

(73) Assignee: JGC Catalysts and Chemicals Ltd., Kawasaki-shi (JP)

( * ) Notice: Subject to any disclaimer, the term of this patent is extended or adjusted under 35 U.S.C. 154(b) by 608 days.

(21) Appl. No.: 13/228,132

(22) Filed: Sep. 8, 2011

(65) Prior Publication Data

US 2012/0065312 A1 Mar. 15, 2012

(30) Foreign Application Priority Data

Sep. 10, 2010 (JP) .................................. 2010-203323

(51) Int. Cl.
| | |
|---|---|
| *C01B 33/20* | (2006.01) |
| *C01G 25/00* | (2006.01) |
| *B82Y 30/00* | (2011.01) |
| *C01G 23/00* | (2006.01) |
| *C01G 23/047* | (2006.01) |
| *C01G 23/053* | (2006.01) |
| *C01G 25/02* | (2006.01) |
| *C09C 1/36* | (2006.01) |

(52) U.S. Cl.
CPC .............. *C01G 25/00* (2013.01); *B82Y 30/00* (2013.01); *C01G 23/00* (2013.01); *C01G 23/047* (2013.01); *C01G 23/0536* (2013.01); *C01G 25/02* (2013.01); *C09C 1/3661* (2013.01); *C01P 2002/72* (2013.01); *C01P 2002/89* (2013.01); *C01P 2004/64* (2013.01); *C01P 2004/80* (2013.01); *C01P 2004/82* (2013.01); *C01P 2004/84* (2013.01); *C01P 2004/86* (2013.01); *C01P 2004/88* (2013.01); *C01P 2006/12* (2013.01)

(58) Field of Classification Search
CPC ...... C01G 25/00; C01G 23/00; C01G 23/047; C01G 23/0536; C01G 25/02; C09C 1/3661; C01P 2002/89; C01P 2004/88; C01P 2004/86; C01P 2004/84; C01P 2004/82; B82Y 30/00
USPC ............... 516/34; 106/287.1, 287.17, 287.19
See application file for complete search history.

(56) References Cited

U.S. PATENT DOCUMENTS

| | | | |
|---|---|---|---|
| 5,789,476 A * | 8/1998 | Iryo et al. ..................... | 524/430 |
| 6,858,294 B1 * | 2/2005 | Tanaka et al. ................ | 428/329 |
| 7,763,110 B2 | 7/2010 | Bluemel et al. | |
| 7,905,953 B2 | 3/2011 | Bluemel et al. | |
| 7,988,780 B2 | 8/2011 | Bluemel et al. | |
| 8,974,592 B2 * | 3/2015 | Ishihara ................ | B82Y 30/00 106/436 |
| 9,234,106 B2 * | 1/2016 | Ishihara ................ | B82Y 30/00 |
| 2005/0059766 A1 * | 3/2005 | Jones et al. ................... | 524/431 |
| 2006/0165964 A1 | 7/2006 | Kato | |
| 2007/0175365 A1 | 8/2007 | Drews-Nicolai et al. | |
| 2008/0031832 A1 | 2/2008 | Wakefield et al. | |
| 2008/0268253 A1 * | 10/2008 | Murai et al. .................. | 428/412 |
| 2009/0029153 A1 | 1/2009 | Naito et al. | |
| 2009/0061183 A1 | 3/2009 | Muraguchi et al. | |
| 2009/0306277 A1 | 12/2009 | Goenner et al. | |
| 2010/0058955 A1 * | 3/2010 | Tanaka et al. ........... | 106/287.13 |
| 2010/0148135 A1 | 6/2010 | Yokoyama | |
| 2011/0257298 A1 * | 10/2011 | Ishihara ................ | B82Y 30/00 523/442 |
| 2012/0132108 A1 * | 5/2012 | Ishihara et al. ............ | 106/287.1 |

FOREIGN PATENT DOCUMENTS

| | | | |
|---|---|---|---|
| EP | 2138462 A1 | | 12/2009 |
| JP | 2000204301 A | | 7/2000 |
| JP | 200416920 A | | 1/2004 |
| JP | 2004018311 A | | 1/2004 |
| JP | 2004238210 A | * | 8/2004 |
| JP | 2004271612 A | | 9/2004 |
| JP | 2005132724 A | | 5/2005 |
| JP | 2006146131 A | | 6/2006 |
| JP | 2006298731 A | | 11/2006 |

(Continued)

OTHER PUBLICATIONS

Machine Translation of Publ. No. JP 2004-238210 A, published Aug. 2004, Japan Patent Office, Tokyo, Japan, online at https://dossier1.j-platpat.inpit.go.jp/tri/all/odse/ODSE__GM101__Top.action (Downloaded Jun. 28, 2015), pp. 1-11.*

Machine Translation of Publ. No. JP 2000-204301 A, published Jul. 2000, Japan Patent Office, Tokyo, Japan, online at https://dossier1.j-platpat.inpit.go.jp/tri/all/odse/ODSE__GM101__Top.action (Downloaded Jun. 28, 2015), pp. 1-35.*

(Continued)

*Primary Examiner* — Daniel S Metzmaier

(74) *Attorney, Agent, or Firm* — The Webb law Firm

(57) ABSTRACT

A dispersion liquid contains fine particles of core-shell type inorganic oxide that have high dispersion stability and transparency and allow for excellent light resistance and weather resistance by being mixed in a coating film. The fine particles are produced by treating the surfaces of (a) fine particles of titanium-containing metal oxide serving as core particles with a hydrate and/or an oxide of a metal element such as zirconium to provide surface-treated particles or fine particles of titanium-containing metal oxide having (b) an intermediate layer and by covering the surfaces of the surface-treated particles to form (c) a shell layer with a composite oxide of silicon and at least one metal element selected from aluminum, zirconium, and antimony.

17 Claims, No Drawings

(56) References Cited

FOREIGN PATENT DOCUMENTS

| | | |
|---|---|---|
| JP | 3969968 B2 | 6/2007 |
| JP | 2007246351 A | 9/2007 |
| JP | 200951680 A | 3/2009 |
| JP | 2009107872 A | 5/2009 |
| WO | 2005072680 A2 | 8/2005 |
| WO | 2007085493 A2 | 8/2007 |
| WO | 2008027979 A2 | 3/2008 |

OTHER PUBLICATIONS

Machine Translation of Publ. No. JP 2007-246351 A, published Sep. 2007, Japan patent Office, Tokyo, Japan, obtained online @ http://www19.ipdl.inpit.go.jp/PA1/cgi-bin/PA1INDEX (Downloaded Feb. 9, 2016).*

* cited by examiner

DISPERSION LIQUID OF FINE PARTICLES OF CORE-SHELL TYPE INORGANIC OXIDE, METHOD FOR PRODUCING THE DISPERSION LIQUID, AND COATING COMPOSITION CONTAINING THE DISPERSION LIQUID

TECHNICAL FIELD

The present invention relates to a dispersion liquid of fine particles of core-shell type inorganic oxide, in particular, to a dispersion liquid of core-shell particles in which titanium-based core particles are covered with silica-zirconia, silica-alumina, or the like, a method for producing such a dispersion liquid, and a coating composition containing such a dispersion liquid.

BACKGROUND ART

Titanium oxide particles are added as a filler having a high refractive index to coating solutions and resin compositions. Such coating solutions and resins are used for various applications and, in particular, they are preferably used as coating solutions for forming films for high-refractive-index optical base materials such as eyeglass lenses.

Coating films for optical lenses need to have transparency and hence are preferably formed of titanium oxide fine particles having a small particle diameter. However, titanium oxide fine particles having a small particle diameter have a high activity and hence the following problem is caused: the weather resistance or light resistance of a film or a base material having a film is degraded and the film becomes separated, or a film tends to suffer from yellowing or bluing.

To suppress such degradation of a film and to enhance the weather resistance of a film, Patent Literature 1 describes a coating film containing inorganic oxide fine particles in which the surfaces of core particles containing titanium oxide are covered with a coating layer composed of a composite oxide of silicon oxide and zirconium oxide and/or aluminum oxide.

Patent Literature 2 describes titanium oxide ultrafine particles in which the surfaces of titanium oxide particles are covered with amorphous zirconium oxide and a coating solution containing the fine particles.

CITATION LIST

Patent Literature

[PTL 1] Japanese Unexamined Patent Application Publication No. 2006-146131
[PTL 2] Japanese Unexamined Patent Application Publication No. 2004-018311

Although the inorganic oxide fine particles described in Patent Literature 1 have excellent weather resistance, the weather resistance needs to be further enhanced.

As for the titanium oxide ultrafine particles described in Patent Literature 2, the weather resistance and light resistance also need to be further enhanced.

SUMMARY OF THE INVENTION

A dispersion liquid according to the present invention contains fine particles of core-shell type inorganic oxide produced by treating the surfaces of (a) fine particles of titanium-containing metal oxide serving as core particles with a hydrate and/or an oxide of at least one metal element selected from zirconium, tin, niobium, barium, lanthanum, strontium, cerium, and lithium to provide surface-treated particles and by covering the surfaces of the surface-treated particles with a composite oxide of silicon and at least one metal element selected from aluminum, zirconium, and antimony.

That is, obtained fine particles of core-shell type inorganic oxide have (b) an intermediate layer on a surface each of (a) the fine particles of titanium-containing metal oxide and further (c) a shell layer on s surface each of (b) the intermediate layer.

The core particles are preferably metal oxide fine particles that contain titanium in the range of 50 to 100% by weight in terms of $TiO_2$.

The core particles are preferably metal oxide fine particles that contain a composite oxide of titanium and at least one metal element selected from tin, silicon, and zirconium.

The core particles are preferably crystalline metal oxide fine particles.

The percentage of the amount of the hydrate and/or the oxide of the at least one metal element on the surfaces of the core particles in terms of oxide with respect to a metal element contained in the core particles is preferably in the range of 0.1 to 20% by mol.

The hydrate and/or the oxide of the at least one metal element on the surfaces of the core particles preferably has an amorphous structure.

The amount of the composite oxide covering the surface-treated particles, which constitute (c) the shell layer covering the fine particles of core-shell type inorganic oxide having (b) the intermediate layer on their surfaces, is preferably in the range of 5 to 100 parts by weight with respect to 100 parts by weight of the surface-treated particles.

The fine particles of core-shell type inorganic oxide in the dispersion liquid having a pH of 6 preferably have a surface-negative charge density in the range of 0.85 to 1.50 $\mu eq/m^2$.

The amount of solid acid present on the surfaces of the fine particles of core-shell type inorganic oxide is preferably in the range of 0.001 to 0.15 mmol/g.

The fine particles of core-shell type inorganic oxide preferably have an average particle diameter in the range of 8 to 60 nm.

The dispersion medium of the dispersion liquid is preferably water and/or at least one organic compound selected from alcohols such as methanol, ethanol, butanol, propanol, and isopropyl alcohol; ethers such as ethylene glycol monomethyl ether, propylene glycol monomethyl ether, and propylene glycol monoethyl ether; and ketones such as methyl ethyl ketone and γ-butyrolactone.

A method for producing a dispersion liquid containing core-shell metal oxide fine particles according to the present invention includes (1) a step of preparing an aqueous dispersion liquid of surface-treated particles or fine particles of titanium-containing metal oxide having the (b) intermediate layer, by adding a metal salt or a metal alkoxide of at least one metal element selected from zirconium, tin, niobium, barium, lanthanum, strontium, cerium, and lithium to an aqueous dispersion liquid containing (a) fine particles of titanium-containing metal oxide having an average particle diameter in the range of 5 to 50 nm such that the percentage of the at least one metal element in terms of oxide with respect to a metal element contained in the metal oxide fine particles is in the range of 0.1 to 20% by mol to provide a mixture, and by subsequently aging the mixture;

(2) a step of adding a silicon compound and a compound of at least one metal element selected from aluminum, zirconium, and antimony to the aqueous dispersion liquid of the surface-treated particles or fine particles of titanium-containing metal oxide having the (b) intermediate layer, prepared by the step (1) to provide a dispersion liquid of fine particles of titanium-containing metal oxide having the (c) shell layer on their surfaces of (b) the intermediate layer; and (3) a step of heating the dispersion liquid obtained by the step (2) at 60° C. to 250° C. for 0.5 to 20 hours.

The method preferably further includes, after the step (1), (1. 1) a step of drying the aqueous dispersion liquid prepared by the step (1) to provide a dry powder;

(1. 2) a step of calcining the dry powder obtained by the step (1. 1) at a temperature of 300° C. to 800° C. to provide a calcined powder of the surface-treated particles or fine particles of titanium-containing metal oxide having the (b) intermediate layer; and (1. 3) a step of dispersing the surface-treated particles obtained by the step (1. 2) back in water.

In the step (1), the aqueous dispersion liquid containing the titanium-containing metal oxide fine particles preferably has a pH in the range of 5 to 11 while the metal salt or the metal alkoxide of the at least one metal element is added thereto.

A coating composition for forming a film according to the present invention contains the fine particles of core-shell type inorganic oxide and a binder component represented by a general formula (I) below

(I)

wherein $R^1$ represents an alkyl group having 1 to 6 carbon atoms, an organic group having a vinyl group and 8 or less carbon atoms, an organic group having an epoxy group and 8 or less carbon atoms, an organic group having a methacryloxy group and 8 or less carbon atoms, an organic group having a mercapto group and 1 to 5 carbon atoms, or an organic group having an amino group and 1 to 5 carbon atoms; $R^2$ represents an alkyl group having 1 to 3 carbon atoms, an alkylene group having 1 to 3 carbon atoms, a cycloalkyl group, a halogenated alkyl group, or an allyl group; $R^3$ represents an alkyl group having 1 to 3 carbon atoms, an alkylene group having 1 to 3 carbon atoms, or a cycloalkyl group; a represents an integer of 0 or 1; and b represents an integer of 0, 1, or 2.

A coating composition for forming a film according to the present invention contains the (1) fine particles of core-shell type inorganic oxide and (2) at least one binder component selected from a thermosetting organic resin, a thermoplastic organic resin, or an ultraviolet curable organic resin.

The coating composition is preferably a coating composition for an optical base material.

The coating composition for an optical base material is preferably a coating composition for forming a hardcoat layer film.

The coating composition for an optical base material is preferably a coating composition for forming a primer layer film.

A curable coating film according to the present invention is obtained by applying the coating composition to a base material. The base material is preferably a plastic lens base material. The curable coating film is preferably a hardcoat layer film or a primer layer film.

Advantageous Effects of Invention

Fine particles of core-shell type inorganic oxide according to the present invention have high dispersion stability and transparency and allow for excellent light resistance and weather resistance by being mixed in a coating film.

This is because, as a result of treating the surfaces of core particles with a hydrate and/or an oxide of at least one metal element selected from zirconium, tin, niobium, barium, lanthanum, strontium, cerium, and lithium to provide surface-treated particles and covering the surfaces of the surface-treated particles with a composite oxide of silicon and at least one metal element selected from aluminum, zirconium, and antimony, the fine particles of core-shell type inorganic oxide having a small amount of solid acid on the surfaces of the fine particles, a high coverage of the surfaces of the fine particles, and a high negative charge density on the surfaces of the fine particles are obtained.

A film and a base material having a film obtained from a coating composition containing such fine particles have excellent adhesion and do not suffer from yellowing or bluing.

A coating film containing fine particles of core-shell type inorganic oxide according to the present invention has an enhanced hardness. This is probably because the surface-negative charge density of the fine particles of core-shell type inorganic oxide increases and, as a result, the stability and the reactivity of the fine particles with a binder component are enhanced and the fine particles are uniformly dispersed within a coating film to thereby form a stable film.

Fine particles of core-shell type inorganic oxide according to the present invention can exhibit excellent weather resistance and light resistance even when the amount of a composite oxide, which constitute (c) the shell layer, covering core particles or (a) fine particles of titanium-containing metal oxide and, or surface-treated particles or fine particles of titanium-containing metal oxide having the (b) intermediate layer, is small. Accordingly, the refractive index of fine particles of core-shell type inorganic oxide can be enhanced. In addition, when crystalline core particles are used, the refractive index of fine particles of core-shell type inorganic oxide can be further enhanced.

DETAILED DESCRIPTION OF THE INVENTION

Core Particles

Core particles according to the present invention are (a) fine particles of titanium-containing metal oxide.

The core particles preferably contain titanium in terms of $TiO_2$ in the range of 50 to 100% by weight, more preferably in the range of 52 to 100% by weight.

When the titanium content is less than 50% by weight, the refractive index of fine particles of core-shell type inorganic oxide becomes low, which is not preferable.

The core particles are preferably metal oxide fine particles that contain a composite oxide of titanium and at least one metal element selected from tin, silicon, and zirconium.

Such core particles are preferred because they have higher stability and allow for enhancement of light resistance and weather resistance.

The core particles may contain, as an auxiliary component, for example, an alkali metal such as potassium or sodium derived from a raw material.

The core particles are preferably crystalline metal oxide fine particles. By using crystalline metal oxide fine particles as the core particles, the refractive index of fine particles of core-shell type inorganic oxide is enhanced, which is preferable.

Herein, "core particles are crystalline particles" means that a crystallite diameter of core particles that is determined with an X-ray diffraction pattern is more than 3 nm. When the crystallite diameter is 3 nm or less, there are cases where the refractive index of core particles becomes low, which is not preferable.

The core particles preferably have one or more crystalline structures selected from the anatase structure, the rutile structure, and the brookite structure.

When the core particles have the rutile crystalline structure, the ultraviolet absorption capability, weather resistance, light resistance, and refractive index of fine particles of core-shell type inorganic oxide are enhanced, which is preferable.

The core particles preferably have an average particle diameter in the range of 5 to 50 nm, more preferably in the range of 5 to 30 nm. When the average particle diameter is less than 5 nm, there are cases where the stability of the core particles is degraded, which is not preferable. When the average particle diameter is more than 50 nm, there are cases where the transparency of a coating film containing fine particles of core-shell type inorganic oxide according to the present invention is degraded, which is not preferable.

The core particles may have any shape, for example, a spherical shape, a chain shape, or a shape like a KONPEITO which is a Japanese traditional small colored sugar candy covered in bulges. When fine particles of core-shell type inorganic oxide containing core particles having a chain shape, are mixed in a film, the film has a high hardness and high resistance to scratching. When fine particles of core-shell type inorganic oxide containing core particles having a KOMPEITO shape are mixed in a film, the film has high adhesion.

In the case of spherical particles, the average particle diameter determined by a BET method or with a TEM photograph is preferably in the above-described range. In the case of KOMPEITO-shaped particles, the average particle diameter determined with a TEM photograph is preferably in the above-described range. In the case of chain-shaped particles, the average particle diameter represented by a formula (L+D)/2 where L represents the longitudinal length of the chain-shaped particles that is determined with a TEM photograph and D represents the lateral length of the chain-shaped particles that is determined with a TEM photograph, is preferably in the above-described range.

Surface-Treated Particles

Surface-treated particles or fine particles of titanium-containing metal oxide having the (b) intermediate layer according to the present invention are particles produced by treating the surfaces of the core particles with a hydrate and/or an oxide of at least one metal element selected from zirconium, tin, niobium, barium, lanthanum, strontium, cerium, and lithium.

This treatment means the following; as a result of a treatment, the surfaces of core particles are partially or entirely covered with the hydrate and/or the oxide of the at least one metal element. The surfaces and adjacent surface of core particles may be doped with at least a portion of the metal elements contained in the hydrate and/or the oxide.

Herein, the term "hydrate" denotes a compound represented by the following formula (1),

$$MO_x(OH)_y \quad (1)$$

wherein M represents at least one metal element selected from zirconium, tin, niobium, barium, lanthanum, strontium, cerium, and lithium; 2x+y=the valence of M; x>0; and y>0.

By treating core particles in the above-described manner, the amount of solid acid on the surfaces of the surface-treated particles or fine particles of titanium-containing metal oxide having the (b) intermediate layer is reduced to suppress the activity of the core particles that is derived from titanium to thereby enhance the weather resistance and light resistance of the surface-treated particles.

The treatment also results in an increase in the surface-negative charge density of surface-treated particles.

In addition, the treatment also allows for an increase in the final coverage of the surfaces of surface-treated particles covered with a composite oxide to thereby enhance the weather resistance, light resistance, and stability of fine particles of core-shell type inorganic oxide.

As for the treatment amount of the hydrate and/or the oxide of the metal element with which the surfaces of core particles are treated and which element is contained in (b) the intermediate layer, the percentage of this amount, with respect to metal elements contained in the core particles, in terms of oxide of at least one metal element selected from zirconium, tin, niobium, barium, lanthanum, strontium, cerium, and lithium, that is, $ZrO_2$, $SnO_2$, $Nb_2O_5$, $BaO$, $La_2O_3$, $SrO$, $CeO_2$, and $Li_2O$, is preferably in the range of 0.1 to 20% by mol, more preferably in the range of 0.1 to 10% by mol.

When the treatment amount is less than 0.1% by mol, for example, the effect of reducing solid acid on the surfaces of core-shell inorganic oxide particles, the effect of increasing the surface-negative charge density, and the effect of increasing the coverage of shells are not sufficiently provided and, as a result, there are cases where weather resistance becomes poor or film hardness is not sufficiently enhanced, which is not preferable. When the treatment amount is more than 20% by mol, the surface-negative charge density of fine particles of core-shell type inorganic oxide decreases and, as a result, there are cases where film hardness becomes low or surface-treated particles or fine particles of titanium-containing metal oxide having the (b) intermediate layer, agglomerate and film transparency becomes poor, which is not preferable.

The hydrate and/or the oxide of the at least one metal element on the surfaces or the surfaces of (b) the intermediate layer of the core particles preferably has an amorphous structure.

When the hydrate and/or the oxide has an amorphous structure, there are cases where fine particles of core-shell type inorganic oxide have enhanced light resistance and stability, which is preferable.

In the present invention, the surfaces of core particles are preferably treated with at least one metal element selected from zirconium, tin, niobium, barium, lanthanum, strontium, cerium, and lithium. These elements constituting the (b) intermediate layer are preferred because they allow for an amorphous structure covering the surfaces of (b) the intermediate layer to form (c) a shell layer.

Fine Particles of Core-shell Type Inorganic Oxide

Fine particles of core-shell type inorganic oxide according to the present invention are produced by covering the surfaces of the surface-treated particles or fine particles of titanium-containing metal oxide having the (b) intermediate layer, with a composite oxide of silicon and at least one metal element selected from aluminum, zirconium, and antimony.

The surface-treated particles or fine particles of titanium-containing metal oxide having the (b) intermediate layer, as formed have insufficient light resistance and weather resistance. However, by covering the surfaces of the surface-treated particles to form (c) the shell layer with a composite oxide of silicon and at least one metal element selected from aluminum, zirconium, and antimony, the resultant particles can exhibit high weather resistance and light resistance.

Aluminum, zirconium, and antimony are metal elements having low optical activity and high refractive index. Formation of a composite oxide of silicon and such metal elements results in formation of a chemically stable film. Thus, these metal elements are suitable as the materials of the composite oxide.

The above-described advantage is achieved not only because the effect of covering the particles to form (c) the shell layer with the composite oxide is provided but also because core particles are surface-treated and further covered with the composite oxide to thereby increase the final coverage of fine particles of core-shell type inorganic oxide. That is, the advantage is markedly achieved, compared with cases where core particles are not surface-treated and are directly covered with the composite oxide. Such core-shell fine particles have a small amount of solid acid on the surfaces thereof and hence have high weather resistance, provide a coating film that does not suffer from film separation, yellowing, or bluing, and have excellent dispersion stability.

By treating the surfaces of core particles with a hydrate and/or an oxide of the metal elements, the surface-negative charge density of fine particles of core-shell type inorganic oxide is increased. As a result, a dispersion liquid of fine particles of core-shell type inorganic oxide according to the present invention has high dispersion stability; and a film containing the fine particles has high hardness and is excellent in terms of resistance to scratching, transparency, and adhesion.

This is probably because fine particles of core-shell type inorganic oxide having a high surface-negative charge density are stable even when they are highly concentrated to a high concentration or they are in an acidic pH range, and also have high reactivity with a binder component and hence they can be uniformly and highly dispersed in a coating composition.

The fine particles of core-shell type inorganic oxide in a dispersion liquid having a pH of 6 preferably have a surface-negative charge density in the range of 0.85 to 1.50 $\mu eq/m^2$, more preferably in the range of 0.9 to 1.50 $\mu eq/m^2$.

When fine particles of core-shell type inorganic oxide have a surface-negative charge density of less than 0.85 $\mu eq/m^2$, a film containing the fine particles of core-shell type inorganic oxide has a low hardness, which is not preferable. When the surface-negative charge density is more than 1.50 $\mu eq/m^2$, the stability of the dispersion liquid is degraded, which is not preferable.

The amount of solid acid present on the surfaces of the fine particles of core-shell type inorganic oxide is preferably in the range of 0.001 to 0.15 mmol/g, more preferably in the range of 0.001 to 0.10 mmol/g.

When the amount of solid acid is less than 0.001 mmol/g, there are cases where the reactivity between the fine particles of core-shell type inorganic oxide and a binder component becomes low and film hardness becomes low, which is not preferable. When the amount of solid acid is more than 0.15 mmol/g, the light resistance and weather resistance of a film containing the fine particles of core-shell type inorganic oxide are degraded, which is not preferable.

The amount of a composite oxide of silicon and at least one metal element selected from aluminum, zirconium, and antimony covering the surface-treated particles is preferably in the range of 5 to 100 parts by weight, more preferably in the range of 7 to 50 parts by weight, with respect to 100 parts by weight of the surface-treated particles or fine particles of titanium-containing metal oxide having the (b) intermediate layer. When the covering amount is less than 5 parts by weight, there are cases where the light resistance, weather resistance, and stability of fine particles of core-shell type inorganic oxide are degraded, which is not preferable. When the covering amount is more than 100 parts by weight, the refractive index of fine particles of core-shell type inorganic oxide becomes low, which is not preferable.

The fine particles of core-shell type inorganic oxide preferably have an average particle diameter in the range of 8 to 60 nm, more preferably in the range of 8 to 30 nm. When the average particle diameter is less than 8 nm, the stability of the fine particles of core-shell type inorganic oxide is degraded, which is not preferable. When the average particle diameter is more than 60 nm, there are cases where the transparency of a film containing the fine particles of core-shell type inorganic oxide is degraded, which is not preferable.

If necessary, the surfaces of fine particles of core-shell type inorganic oxide according to the present invention may be further treated with, for example, a publicly known surface-treatment agent or a publicly known silane coupling agent.

Dispersion Liquid Containing Fine Particles of Core-Shell Type Inorganic Oxide

A dispersion liquid containing fine particles of core-shell type inorganic oxide according to the present invention is a dispersion liquid containing the above-described fine particles of core-shell type inorganic oxide.

The dispersion medium of the dispersion liquid is preferably water and/or at least one organic compound selected from alcohols such as methanol, ethanol, butanol, propanol, and isopropyl alcohol; ethers such as ethylene glycol monomethyl ether, propylene glycol monomethyl ether, and propylene glycol monoethyl ether; ketones such as methyl ethyl ketone and γ-butyrolactone.

The solid content concentration of the dispersion liquid is preferably in the range of 10 to 50% by weight, more preferably in the range of 20 to 40% by weight. When the solid content concentration is less than 10% by weight, there are cases where a coating composition containing such a dispersion liquid is less likely to provide desired film properties, which is not preferable. When the solid content concentration is more than 50% by weight, there are cases where the stability of the dispersion liquid is degraded, which is not preferable.

The dispersion liquid containing the fine particles of core-shell type inorganic oxide has high dispersion stability and transparency and excellent weather resistance because the fine particles have a high surface coverage and a high surface charge density.

A film formed from a coating composition containing the dispersion liquid has a high refractive index, is excellent in terms of weather resistance, light resistance, film hardness, resistance to scratching, adhesion, and transparency, and is less likely to suffer from film separation, yellowing, bluing, or the like. Accordingly, the dispersion liquid is suitably added to coating compositions for optical base materials, in particular, coating compositions for forming hardcoat layer films and coating compositions for forming primer layer films.

Method for Producing Dispersion Liquid Containing Fine Particles of Core-shell Type Inorganic Oxide Hereinafter, a method for producing a dispersion liquid containing fine particles of core-shell type inorganic oxide according to the present invention will be specifically described.

A method for producing a dispersion liquid containing fine particles of core-shell type inorganic oxide according to the present invention includes (1) a step of preparing an aqueous dispersion liquid of surface-treated particles or fine particles of titanium-containing metal oxide having (b) the intermediate layer by adding a metal salt or a metal alkoxide of at least one metal element selected from zirconium, tin, niobium, barium, lanthanum, strontium, cerium, and lithium to an aqueous dispersion liquid containing (a) fine particles of titanium-containing metal oxide (core particles) having an average particle diameter in the range of 5 to 50 nm such that the percentage of the at least one metal element in terms of oxide with respect to a metal element contained in the metal oxide fine particles is in the range of 0.1 to 20% by mol to provide a mixture, and by subsequently aging the mixture;

(2) a step of adding a silicon compound and a compound of at least one metal element selected from aluminum, zirconium, and antimony to the aqueous dispersion liquid of the surface-treated particles prepared by the step (1) to provide an aqueous dispersion liquid of fine particles of titanium-containing metal oxide having (c) the shell layer on the surface of (c) the intermediate layer; and (3) a step of heating the aqueous dispersion liquid obtained by the step (2) at 60° C. to 250° C. for 0.5 to 20 hours.

These steps will be specifically described.

Step (1)

This is a step of preparing an aqueous dispersion liquid of surface-treated particles or fine particles of titanium-containing metal oxide having the (b) intermediate layer by adding a metal salt or a metal alkoxide of at least one metal element selected from zirconium, tin, niobium, barium, lanthanum, strontium, cerium, and lithium to a dispersion liquid containing fine particles of titanium-containing metal oxide having an average particle diameter in the range of 5 to 50 nm, that is core particles, and by subsequently aging the resultant mixture so that the at least one metal element is bonded to the surfaces of the core particles or allowed to react with the surfaces of the core particles.

The aqueous dispersion liquid containing core particles can be produced by any publicly known method.

For example, an aqueous dispersion liquid containing core particles can be preferably produced by a method of subjecting an aqueous mixture of peroxytitanic acid and potassium stannate and/or a silicon compound to a hydrothermal treatment with an autoclave at a temperature of 150° C. to 250° C.

If necessary, the aqueous dispersion liquid containing core particles may be heated such that the core particles are turned into crystalline core particles. In this case, a powder obtained by heating core particles is pulverized and dispersed back in water to prepare an aqueous dispersion liquid that is to be subjected the subsequent treatment.

The metal salt of at least one metal element selected from zirconium, tin, niobium, barium, lanthanum, strontium, cerium, and lithium may be, for example, a hydrochloride, a nitrate, a sulfate, a carbonate, an ammonium carbonate, or an acetate; preferably, a hydrochloride, a carbonate, an ammonium carbonate, or an acetate.

A metal salt or a metal alkoxide of at least one metal element selected from zirconium, tin, niobium, barium, lanthanum, strontium, cerium, and lithium is added to the aqueous dispersion liquid such that the percentage of the total amounts of zirconium, tin, niobium, barium, lanthanum, strontium, cerium, and lithium added in terms of oxide with respect to metal elements contained in the core particles is preferably in the range of 0.1 to 20% by mol, more preferably in the range of 0.1 to 10% by mol.

When the amount of the metal elements added is less than 0.1% by mol, the core particles are not sufficiently treated with the metal elements and the weather resistance, light resistance, and stability of the fine particles of core-shell type inorganic oxide are degraded, which is not preferable. When the amount of the metal elements added is more than 20% by mol, surface-treated particles or fine particles of titanium-containing metal oxide having the (b) intermediate layer, tend to agglomerate through crosslinking, which is not preferable.

The aging of the mixture prepared by adding a metal salt or a metal alkoxide of the metal elements to the aqueous dispersion liquid of core particles is preferably performed at 30° C. to 90° C. for 1 to 24 hours, more preferably under stirring. By performing aging under such conditions, the metal element is bonded to the surfaces of the core particles or allowed to react with the surfaces of the core particles.

The aqueous dispersion liquid containing the core particles preferably has a pH in the range of 5 to 11, more preferably in the range of 6 to 9, while the metal salt or the metal alkoxide of the metal elements is added thereto.

When the pH is less than 5, the core particles tend to agglomerate, which is not preferable. When the pH is more than 11, metal elements are less likely to precipitate, which is not preferable. If necessary, the pH can be adjusted with a pH adjustor such as a mineral acid, an organic acid, carbon dioxide or alkali metal salt such as potassium hydrate.

Step (2)

Subsequently, a silicon compound and a compound of at least one metal element selected from aluminum, zirconium, and antimony are added to the aqueous dispersion liquid prepared by the step (1) to thereby form a precursor of a composite oxide of silicon and at least one metal element selected from aluminum, zirconium, and antimony on the surfaces of the particles contained in the aqueous dispersion liquid.

The silicon compound is preferably silicic acid and/or silane alkoxide. The aluminum compound is preferably aluminate and/or aluminum alkoxide. The zirconium compound is preferably zirconate and/or zirconium alkoxide. The antimony compound is preferably antimonate.

Such compounds are preferably added such that the amount of a composite oxide of silicon and at least one metal element selected from aluminum, zirconium, and antimony covering the surface-treated particles or fine particles of titanium-containing metal oxide having the (b) intermediate layer, contained in the aqueous dispersion liquid prepared in the step (1) is in the range of 5 to 100 parts by weight, more preferably in the range of 7 to 50 parts by weight, with respect to 100 parts by weight of the surface-treated particles. When the covering amount is less than 5 parts by weight, there are cases where the light resistance, weather resistance, and stability of fine particles of core-shell type inorganic oxide are degraded, which is not preferable. When the covering amount is more than 100 parts by weight, the refractive index of fine particles of core-shell type inorganic oxide is degraded, which is not preferable.

Step (3)

Subsequently, the aqueous dispersion liquid obtained by the step (2) is heated at 60° C. to 250° C. for 0.5 to 20 hours to cause a dehydration-condensation reaction of the precursor of a composite oxide of silicon and at least one metal element selected from aluminum, zirconium, and antimony. As a result, an aqueous dispersion liquid of fine particles of core-shell type inorganic oxide can be provided.

In addition, the following steps are preferably performed between the step (1) and the step (2):

(1. 1) a step of drying the aqueous dispersion liquid prepared by the step (1) to provide a dry powder;

(1. 2) a step of calcining the dry powder obtained by the step (1. 1) at a temperature of 300° C. to 800° C. to provide a calcined powder of the surface-treated particles or fine particles of titanium-containing metal oxide having the (b) intermediate layer; and (1. 3) a step of dispersing the surface-treated particles or fine particles of titanium-containing metal oxide having the (b) intermediate layer obtained by the step (1. 2) back in water.

Hereinafter, these steps will be specifically described.

Step (1. 1)

This step is a step of drying the aqueous dispersion liquid prepared by the step (1) to provide a dry powder.

The drying may be performed by any method, but spray drying and freeze drying are preferred. Particles dried by these methods have high redispersibility, which is preferable.

Step (1. 2)

This step is a step of calcining the dry powder obtained by the step (1. 1) at a temperature of 300° C. to 800° C., more preferably at a temperature of 400° C. to 700° C., for 30 to 240 hours to provide a calcined powder of the surface-treated particles or fine particles of titanium-containing metal oxide having the (b) intermediate layer.

This step turns core particles into crystalline core particles, resulting in an increase in the refractive index and enhancement of light resistance and weather resistance. In addition, the surfaces of the core particles are treated with a hydrate and/or an oxide of at least one metal element selected from zirconium, tin, niobium, barium, lanthanum, strontium, cerium, and lithium.

As a result of this step, the hydrate and/or the oxide of the metal element can be strongly bonded to the surfaces of core particles. Thus, the light resistance, weather resistance, stability, and the like of fine particles of core-shell type inorganic oxide can be further enhanced. In addition, in this step, the surfaces or adjacent surface of core particles are doped with at least a portion of the metal element and, as a result, the weather resistance and light resistance of core-shell oxide fine particles can be further enhanced.

When this step is not performed, surface-treated particles or fine particles of titanium-containing metal oxide having the (b) intermediate layer are formed by the heating treatment in the step (3) at the same time when fine particles of core-shell type inorganic oxide are formed. This is because, before a heat treatment is performed, the metal element is mainly bonded in the form of a hydroxide to the surfaces of core particles and is not in the form of a hydrate and/or an oxide. When the metal element treated to core particles is not in the form of a hydrate and/or an oxide, there are cases where the bonding force between the at least one metal element and core particles is low and the stability, weather resistance, and light resistance of fine particles of core-shell type inorganic oxide are degraded, which is not preferable.

Step (1. 3)

In this step, the surface-treated particles or fine particles of titanium-containing metal oxide having the (b) intermediate layer obtained by the step (1. 2) are dispersed back in water.

At this time, the calcined powder of the surface-treated particles is preferably pulverized and then dispersed back in water.

Specifically, the step is preferably performed as follows: if necessary, the calcined powder of the surface-treated particles is mixed with tartaric acid, KOH, or the like so as to have a pH in the range of 3 to 11, and pulverized with a sand mill or the like containing alumina beads or the like. The beads are then removed and the resultant pulverized calcined powder of the surface-treated particles is dispersed back in water.

The step is subsequently preferably performed as follows: if necessary, an anion-exchange resin is added to the resultant aqueous dispersion liquid to remove excessive tartaric acid and potassium ions and the anion-exchange resin is removed. The resultant aqueous dispersion liquid is optionally subjected to centrifugal separation to remove coarse particles.

A dispersion liquid of surface-treated particles or fine particles of titanium-containing metal oxide having the (b) intermediate layer that are dispersed back in such a manner has high transparency and stability, which is preferable.

An aqueous dispersion liquid containing fine particles of core-shell type inorganic oxide according to the present invention can be produced by the above-described method.

If necessary, the thus-obtained aqueous dispersion liquid containing fine particles of core-shell type inorganic oxide may be concentrated or the solvent thereof may be replaced with another solvent.

The solvent used for the replacement may be an organic compound selected from alcohols such as methanol, ethanol, butanol, propanol, and isopropyl alcohol; ethers such as ethylene glycol monomethyl ether, propylene glycol monomethyl ether, and propylene glycol monoethyl ether; ketones such as methyl ethyl ketone and γ-butyrolactone. These solvents may be used in combination.

If necessary, a publicly known silane coupling agent or a publicly known surface-treatment agent may be added to the aqueous dispersion liquid containing fine particles of core-shell type inorganic oxide to thereby treat the surfaces of the fine particles of core-shell type inorganic oxide with such an agent.

Coating Composition

A coating composition according to the present invention is preferably a coating composition for forming a film, the coating composition containing fine particles of core-shell type inorganic oxide according to the present invention and a binder component represented by a general formula (I) below

$$R^1_a R^2_b Si(OR^3)_{4-(a+b)} \quad (I)$$

wherein $R^1$ represents an alkyl group having 1 to 6 carbon atoms, an organic group having a vinyl group and 8 or less carbon atoms, an organic group having an epoxy group and 8 or less carbon atoms, an organic group having a methacryloxy group and 8 or less carbon atoms, an organic group having a mercapto group and 1 to 5 carbon atoms, or an organic group having an amino group and 1 to 5 carbon atoms; $R^2$ represents an alkyl group having 1 to 3 carbon atoms, an alkylene group having 1 to 3 carbon atoms, a cycloalkyl group, a halogenated alkyl group, or an allyl group; $R^3$ represents an alkyl group having 1 to 3 carbon atoms, an alkylene group having 1 to 3 carbon atoms, or a cycloalkyl group; a represents an integer of 0 or 1; and b represents an integer of 0, 1, or 2.

Representative examples of organic silicon compounds represented by the general formula (I) are alkoxy silane compounds and specific examples of alkoxy silane compounds include tetraethoxysilane, methyltrimethoxysilane, vinyltrimethoxysilane, γ-methacryloxypropyltrimethoxysilane, α-glycidoxymethyltrimethoxysilane, α-glycidoxyethyltrimethoxysilane, β-glycidoxyethyltrimethoxysilane, γ-glycidoxypropyltrimethoxysilane, γ-glycidoxypropyltriethoxysilane, γ-glycidoxypropylmethyldimethoxysilane, γ-γ-glycidoxypropylmethyldiethoxysilane, β-(3,4-epoxycyclohexyl)-ethyltrimethoxysilane, β-(3,4-epoxycyclohexyl)-ethyltriethoxysilane, γ-aminopropyltrimethoxysilane, γ-aminopropyltriethoxysilane, N-β(aminoethyl)-γ-aminopropylmethyldimethoxysilane, and N-β(aminoethyl)-γ-aminopropylmethyldiethoxysilane. These examples may be used alone or in combination.

Films formed from a coating composition containing such a binder component and the fine particles of core-shell type inorganic oxide have good film-formation properties, a high refractive index, high light resistance, high weather resistance, do not suffer from yellowing or bluing, have high film hardness, high resistance to scratching, high adhesion, and high transparency, which is preferable.

The coating composition is preferably a coating composition for an optical base material.

The coating composition is more preferably a coating composition for forming a hardcoat layer film.

A coating composition according to the present invention is preferably a coating composition for forming a film, the coating composition containing fine particles of core-shell type inorganic oxide according to the present invention and at least one binder component selected from a thermosetting organic resin, a thermoplastic organic resin, and an ultraviolet curable organic resin.

The thermosetting organic resin is preferably at least one selected from a urethane resin, an epoxy resin, and a melamine resin.

Specifically, the urethane resin is, for example, a reaction product between a block polyisocyanate such as hexamethylenediisocyanate and an active-hydrogen-containing compound such as polyester polyol or polyether polyol. The epoxy resin is, for example, a polyalkylene ether-modified epoxy resin or an epoxy-group-containing compound in which a soft segment is introduced into the molecular chain.

The melamine resin is, for example, a cured product between etherified methylol melamine and polyester polyol or polyether polyol. In particular, a urethane resin that is a cured product between a block isocyanate and a polyol is preferably used. These thermosetting organic resins may be used alone or in combination.

The thermoplastic organic resin is preferably at least one selected from an acrylic resin, a urethane resin, and an ester resin, more preferably a self-emulsified aqueous emulsion resin.

Films formed from a coating composition containing such a binder component and the fine particles of core-shell type inorganic oxide have good film-formation properties, a high refractive index, high light resistance, high weather resistance, do not suffer from yellowing or bluing, have high film hardness, high impact resistance, high resistance to scratching, high adhesion, and high transparency, which is preferable.

The coating composition is preferably a coating composition for an optical base material.

The coating composition is more preferably a coating composition for forming a primer layer film.

By applying a coating composition according to the present invention onto a base material and curing the coating composition, a cured coating film can be obtained. This cured coating film has a high refractive index, high light resistance, and high weather resistance, does not suffer from yellowing or bluing, and is excellent in terms of film hardness, resistance to scratching, adhesion, and transparency.

The base material may be composed of, for example, plastic, glass, or metal and a plastic lens is preferably used.

The cured coating film is preferably a hardcoat layer film.

The cured coating film is preferably a primer layer film.

A coating composition according to the present invention can be produced by mixing an aqueous dispersion liquid or an organic solvent dispersion liquid according to the present invention with the binder component.

[Measurement Methods]

Hereinafter, measurement methods and evaluation test methods used in Examples of the present invention and the like will be specifically described.

(1) Average Particle Diameter of Particles

A sample that has a solid content of 0.15% and is prepared by mixing 0.15 g of an aqueous dispersion sol (solid content of 20% by weight) containing titanium-based fine particles or metal oxide fine particles having a particle diameter on the order of nanometers with 19.85 g of pure water is placed in a quartz cell having a length of 1 cm, a width of 1 cm, and a height of 5 cm. The particle diameter distribution of the particle groups is measured with an ultrafine particle size analyzer (model: ELS-Z2, manufactured by Otsuka Electronics Co., Ltd.) by dynamic light scattering. The term "average particle diameter" in the present invention denotes a value calculated from the measurement result by cumulant analysis. Note that it has been found that the average particle diameter obtained from the particle diameter distribution of fine particles measured with the ultrafine particle size analyzer by dynamic light scattering is about three times the average particle diameter obtained from a TEM photograph of the fine particles taken with a transmission electron microscope. Accordingly, the average particle diameter of fine particles defined in the present invention is different from an average particle diameter obtained by another measurement method. Note that the measurement method is suitable for measuring the average particle diameter of particle groups having a particle diameter of 3 to 1000 nm.

(2) Specific Surface Area of Particles

About 30 ml of a dry powder of composite oxide particles (titanium-based particles) or titanium-based fine particles is taken into a porcelain crucible (B-2 type), dried at 300° C. for 2 hours, and subsequently cooled to room temperature in a desiccator. Subsequently, 1 g of a sample is taken from the resultant powder and measured in terms of specific surface area ($m^2/g$) by BET method with an automatic surface area measurement apparatus (MULTISORB 12, manufactured by Yuasa-Ionics Co., Ltd.). Note that the term "specific surface area" in the present invention denotes a value calculated from the measurement result.

(3) Crystalline Form of Particles

About 30 ml of an aqueous dispersion sol of composite oxide particles (titanium-based particles) or titanium-based fine particles is taken into a porcelain crucible (B-2 type), dried at 110° C. for 12 hours, subsequently cooled to room temperature in a desiccator, then pulverized with a mortar for 15 minutes, and subsequently measured in terms of crystalline form with an X-ray diffractometer (RINT1400, manufactured by Rigaku Corporation). Note that the term "crystalline form" is a form (for example, a rutile structure etc.) determined from the measurement result.

(4) X-ray Diffraction Crystallite Diameter of Particles

The calcined composite oxide particles (titanium-based particles) or titanium-based fine particles are measured with the X-ray diffractometer used in (3) and the crystalline structure thereof is determined from the measurement result. The term "X-ray diffraction crystallite diameter (D)" in the present invention is a value calculated with the following Scheller formula, $$D = \lambda/\beta \cos \theta$$

wherein $\lambda$ represents the wavelength of an X-ray, $\beta$ represents half-width, and $\theta$ represents reflection angle. Note that the wavelength $\lambda$ of an X-ray ($CuK_\alpha$ radiation) used in this measurement is 0.154056 nm. The reflection angle $\theta$ is calculated with $2\theta$ measured in terms of a rutile crystal face (110).

(5) Contents of Metal Oxides in Particles

An aqueous dispersion sol (sample) containing metal oxide fine particles is taken into a zirconia bowl, dried, calcined, then mixed with $Na_2O_2$ and NaOH to be dissolved, further dissolved with $H_2SO_4$ and HCl, and diluted with pure water. The content of titanium, tin, aluminum, antimony, and/or silica of the sample is then measured in terms of oxide (that is, $TiO_2$, $SnO_2$, $Al_2O_3$, $Sb_2O_5$, and/or $SiO_2$) with an ICP apparatus (ICPS-8100, manufactured by SHIMADZU CORPORATION).

The sample is then taken into a platinum dish, mixed with HF and $H_2SO_4$ and heated, dissolved with HCl, and further diluted with pure water. The zirconium content of the sample is then measured in terms of oxide ($ZrO_2$) with an ICP apparatus (ICPS-8100, manufactured by SHIMADZU CORPORATION).

The sample is then taken into a platinum dish, mixed with HF and $H_2SO_4$ and heated, dissolved with HCl, and further diluted with pure water. The potassium content of the sample is then measured in terms of oxide ($K_2O$) with an atomic absorption spectrometer (Z-5300, manufactured by Hitachi, Ltd.).

Note that each metal oxide content in the present invention denotes a value calculated from such a measurement result.

(6) Photocatalytic Activity Test of Particles

A sample is prepared by mixing 0.66 g of an aqueous dispersion sol (solid content of 20% by weight) containing metal oxide fine particles with 9.34 g of pure water. Subsequently, 0.33 g of the sample having a solid content of 6.6% by weight is mixed with 9.70 g of a glycerin solution of Sunset Yellow dye having a solid content of 0.02% by weight and then charged into a quartz cell having a length of 1 mm, a width of 1 cm, and a height of 5 cm. The quartz cell is sealed and then irradiated with ultraviolet rays with an ultraviolet lamp (SLUV-6, manufactured by AS ONE corporation) in which I-line (wavelength: 365 nm) wavelength range is selected at an irradiation distance of 5.5 cm and with an irradiation intensity of 0.4 mW/cm² (in terms of wavelength of 365 nm) for 180 minutes.

Before and after the irradiation with ultraviolet rays, the absorbance ($A_0$ and $A_{180}$) of the sample at a wavelength of 490 nm is measured and a fade change ratio (%) of the dye is calculated with a formula below. In addition, the photocatalytic activity of particles is evaluated on the basis of a formula below.

$$\text{Fade change ratio (\%)} = (1 - A_{180}/A_0) \times 100$$

Evaluation Standard

Good: fade change ratio (%) of less than 20%
Fair: fade change ratio (%) of 20% or more and less than 50%
Poor: fade change ratio (%) of 50% or more (7) Light Resistance Test of Particles A sample is prepared by mixing 0.90 g of an aqueous dispersion sol (solid content of 20% by weight) containing metal oxide fine particles with 4.50 g of pure water and 12.6 g of methanol. Subsequently, 18.00 g of the sample having a solid content of 1.0% by weight is charged into a quartz cell having a length of 1 mm, a width of 1 cm, and a height of 5 cm. The quartz cell is sealed and then irradiated with ultraviolet rays with an ultraviolet lamp (SLUV-6, manufactured by AS ONE corporation) in which I-line (wavelength: 365 nm) wavelength range is selected at an irradiation distance of 5.5 cm and with an irradiation intensity of 0.4 mW/cm² (in terms of wavelength of 365 nm) for 60 minutes. Change in the color of the mixture exposed to the ultraviolet rays is observed by visual inspection and evaluated with the following standard.

Evaluation Standard

Good: bluing starts after a lapse of one or more hours
Fair: bluing starts after a lapse of 0.5 hours or more and less than an hour
Poor: bluing starts after a lapse of less than 0.5 hours (8) Appearance of Coating Film (Interference Fringes)

A fluorescent lamp "trade name: Mellow 5N" (three-wavelength neutral white fluorescent lamp, manufactured by TOSHIBA LIGHTING & TECHNOLOGY CORPORATION) is attached within a box whose inner walls are black. Light from the fluorescent lamp is made to be reflected by the surface of an antireflective film formed on a hardcoat layer film (containing the metal oxide fine particles) on a sample plate and generation of rainbow patterns (interference fringes) due to optical interference is visually inspected and evaluated with the following standard.

S: almost no interference fringes
A: interference fringes obscure
B: interference fringes visible but within allowable range
C: interference fringes noticeably visible
D: bright interference fringes visible (9) Appearance of Coating Film (Cloudiness)

A fluorescent lamp "trade name: Mellow 5N" (three-wavelength neutral white fluorescent lamp, manufactured by TOSHIBA LIGHTING & TECHNOLOGY CORPORATION) is attached within a box whose inner walls are black. A sample plate having a hardcoat layer film containing the metal oxide fine particles is placed so as to be immediately below and perpendicular to the fluorescent lamp, observed in terms of transparency (degree of cloudiness) by visual inspection, and evaluated with the following standard.

A: not cloudy
B: slightly cloudy
C: clearly cloudy
D: severely cloudy

(10) Scratching Resistance Test of Coating Film

The surface of a hardcoat layer film formed on a sample plate is manually rubbed with Bonstar Steel Wool #0000 (manufactured by NihonSteelWool Co., Ltd.). The degree to which the surface is scratched is visually inspected and evaluated with the following standard.

A: almost no scratched
B: slightly scratched
C: considerably scratched
D: almost the entire rubbed area is scratched

(11) Adhesion Test of Coating Film

The surface of a hardcoat layer film formed on a sample lens base is cut at a pitch of 1 mm with a knife so as to form a grid pattern composed of 100 squares having 1 mm². A cellophane adhesive tape is strongly pressed onto the squares and then sharply removed in a direction at 90° with respect to the in-plane direction of the plastic lens base. This process is repeated five times in total and the number of squares in which film separation is not caused is counted. The evaluation is performed with the following standard.

Good: the number of squares in which film separation is not caused is 95 or more Poor: the number of squares in which film separation is not caused is less than 95

(12) Weather Resistance Test of Coating Film

A sample plate on which a hardcoat layer film is formed is subjected to an exposure test with a Xenon Weather Meter (X-75, manufactured by Suga Test Instruments Co., Ltd.). After that, the appearance of the base is observed and the base is subjected to the same adhesion test as in (11) and evaluated with a standard below. Note that the exposure time is 200 hours for a base having an antireflective film and 50 hours for a base without an antireflective film.

Good: the number of squares in which film separation is not caused is 95 or more Poor: the number of squares in which film separation is not caused is less than 95

(13) Light Resistance Test of Coating Film

A specimen is irradiated with ultraviolet rays with a mercury lamp for a fading test (H400-E, manufactured by TOSHIBA CORPORATION) for 50 hours. Before and after this test, the lens color of the specimen is observed by visual inspection and evaluated with a standard below. Note that the irradiation distance between the specimen and the lamp is 70 mm. The output of the lamp is adjusted such that the surface temperature of the specimen is 45±5° C. This test is performed for plastic lenses in which an antireflective film is formed on the surface of a hardcoat layer.

Good: discoloration is not noticeable

Fair: slightly discolored

Poor: clearly discolored

(14) Measurement Method of Film Hardness (Bayer Value)

A Bayer value is measured from changes in haze of a test lens prepared in a preparation example of an Example and a standard lens with an abrasion tester BTM (manufactured by COLTS Laboratories, Inc. in the U.S.) and a haze meter (NDH2000, manufactured by NIPPON DENSHOKU INDUSTRIES CO., LTD.). As the standard lens, a commercially available plastic lens base material CR-39 (diethylene glycol bis(allyl carbonate), monomers manufactured by PPG Industries, Inc. are used, refractive index of base material: 1.60). The haze of the lenses is measured. The initial haze of the standard lens is defined as D(std0) and the initial haze of the test lens is defined as D(test0). The lenses are placed on the pan of the abrasion tester, covered with 500 g of an abrasive (sand for the tester), and tested by being oscillated left and right 600 times. The haze of the standard lens after the test is defined as D(stdf) and the haze of the test lens after the test is defined as D(testf). The Bayer test value (R) is calculated with the following formula.

$$R=[D(\text{stdf})-D(\text{std0})]/[D(\text{testf})-D(\text{test0})]$$

(15) Measurement Method of Amount of Surface-Negative Charge

To 1.67 g of a dispersion liquid of fine particles of core-shell type inorganic oxide, a dispersion medium of which may be water or organic solvent, having solid concentration of 30% by weight, 98.53 g of distilled water was added to form a 100 g of mixed solution having a solid concentration of 0.5% by weight. To the mixed solution, hydrochloric solution or ammonia solution was added to prepare a solution for the measurement having pH of 6 at a temperature of 25° C. 20.0 g of the obtained solution was subjected to the titration measurement. The titration value of the streaming potential was obtained by measuring a titration value of the streaming potential of Poly-Dynamic as a standard cation titration liquid with a streaming potential measuring apparatus (PCD-T3, manufactured by MUTEK).

The obtained value (μeq/g) according the above-mentioned method is a surface-negative charge per 1 g of fine particles of core-shell type inorganic oxide. The surface-negative charge density, which is an amount of negative charge per unit surface of the fine particles of core-shell type inorganic oxide, is defined as a value obtained by dividing the above-mentioned value (μeq/g) by the unit surface area ($m^2$/g) of the fine particles of core-shell type inorganic oxide.

EXAMPLES

Hereinafter, the present invention will be specifically described with reference to Examples. However, the present invention is not limited to the scope of the Examples.

Example 1

Preparation of Aqueous Dispersion Sol (P-1) of Core Fine Particles

A white slurry having a pH of 9.5 was prepared by mixing 7.63 kg of an aqueous solution of titanium tetrachloride containing 7.75% by wt of titanium tetrachloride (manufactured by OSAKA Titanium technologies Co., Ltd.) in terms of $TiO_2$ and 2.96 kg of aqueous ammonia containing 15% by weight of ammonia (manufactured by Ube Industries, Ltd.). This slurry was then filtrated and subsequently washed with ion-exchanged water to provide 6.22 kg of water-containing titanic acid cake having a solid content of 10% by weight.

The cake was subsequently mixed with 7.11 kg of aqueous hydrogen peroxide containing 35% by weight of hydrogen peroxide (manufactured by MITSUBISHI GAS CHEMICAL COMPANY, INC.) and 20.00 kg of ion-exchanged water, then heated at 80° C. for an hour under stirring, and further mixed with 28.89 kg of ion-exchanged water to provide 62.22 kg of an aqueous solution of peroxytitanic acid containing 1% by weight of peroxytitanic acid in terms of $TiO_2$. This aqueous solution of peroxytitanic acid was a transparent yellow-brown solution having a pH of 8.5.

Subsequently, 62.22 kg of the aqueous solution of peroxytitanic acid was mixed with 3.00 kg of a cation-exchange resin (manufactured by Mitsubishi Chemical Corporation). To the resultant mixture solution under stirring, 7.78 kg of an aqueous solution of potassium stannate containing 1% by weight of potassium stannate (manufactured by Showa Kako Corporation) in terms of $SnO_2$ was gradually added.

The cation-exchange resin having captured potassium ions and the like was then separated from the mixture solution. After that, the resultant mixture solution was heated in an autoclave (120L, manufactured by Taiatsu Techno Corporation) at 165° C. for 18 hours.

The resultant aqueous mixture solution was then cooled to room temperature and subsequently concentrated with an ultrafiltration membrane apparatus (ACV-3010, manufactured by Asahi Kasei Corporation) to provide 7.00 kg of an aqueous dispersion liquid of core fine particles having a solid content of 10% by weight.

The thus-obtained aqueous dispersion sol containing metal oxide fine particles was a transparent milk-white sol.

The contents of metal components in the metal oxide fine particles were measured and the result in terms of oxide of each metal component were 87.5% by weight of $TiO_2$, 10.6% by weight of $SnO_2$, and 1.8% by weight of $K_2O$. The metal oxide fine particles had an average particle diameter of 18 nm, a specific surface area of 161 $m^2/g$, and a charge density of 1.447 μeq/$m^2$. The metal oxide fine particles were measured by X-ray diffraction and found to be constituted by rutile crystals having a crystallite size of 9.1 nm.

Preparation of Aqueous Dispersion Sol (ST-1) of Surface-Treated Metal Oxide Fine Particles An aqueous dispersion liquid of metal oxide fine particles surface-treated with zirconium or fine particles of titanium-containing metal oxide having the (b) intermediate layer, was obtained by gradually adding 1.53 kg of an aqueous solution of zirconium oxychloride octahydrate having a concentration of 3.6% in terms of $ZrO_2$ by weight to 7.00 kg of the aqueous dispersion sol (P-1) of core fine particles obtained above while the pH of the sol was adjusted to be 7.0 with an aqueous solution of potassium hydroxide, and by stirring the resultant mixture at 40° C. for an hour. At this time, the zirconium content in terms of oxide with respect to the metal elements contained in the core fine particles was 5.0% by mol.

Subsequently, 8.53 kg of the aqueous dispersion liquid of the zirconium-surface-treated metal oxide fine particles was subjected to spray drying with a spray dryer (NIRO ATOMIZER, manufactured by NIRO) to provide 0.92 kg of a dry powder constituted by surface-treated metal oxide fine particles or fine particles of titanium-containing metal oxide having the (b) intermediate layer, having an average particle diameter of about 2 μm.

Subsequently, 0.92 kg of the thus-obtained dry powder of surface-treated metal oxide fine particles was calcined in the air atmosphere at 500° C. for 2 hours to provide 0.85 kg of a calcined powder of surface-treated metal oxide fine particles or fine particles of titanium-containing metal oxide having the (b) intermediate layer.

No crystalline peaks derived from zirconium with which the core particles were surface-treated were detected in an XRD pattern of the calcined powder of surface-treated metal oxide fine particles. Accordingly, it was found that zirconium in the form of an oxide and/or a hydrate having an amorphous structure covered the core particles.

The calcined powder (0.20 kg) of surface-treated metal oxide fine particles obtained above was dispersed in 0.18 kg of pure water. The resultant dispersion liquid was mixed with 0.13 kg of a 28.6% aqueous solution of tartaric acid and 0.06 kg of a 50% by weight KOH aqueous solution, sufficiently stirred, and then mixed with alumina beads having a size of 0.1 mm (high-purity alumina beads, manufactured by TAIMEI CHEMICALS CO., LTD.). The resultant mixture was charged into a wet pulverizer (a batch desktop sand mill manufactured by Kanpe Hapio Co., Ltd.) and the calcined powder of titania-based composite oxide fine particles was subjected to a pulverization and dispersion treatment for 180 minutes. After that, the alumina beads were removed with a stainless steel filter having 44-μm openings. The resultant dispersion liquid was then mixed with 1.36 kg of pure water and stirred to provide 1.72 kg of an aqueous dispersion liquid of surface-treated metal oxide fine particles or fine particles of titanium-containing metal oxide having the (b) intermediate layer having a solid content of 11% by weight.

The aqueous dispersion liquid was then washed with ion-exchanged water through an ultrafiltration membrane, subsequently mixed with 0.09 kg of an anion-exchange resin (SANUPC, manufactured by Mitsubishi Chemical Corporation) to be deionized, then subjected to a treatment with a centrifuge (CR-21G, manufactured by Hitachi Koki Co., Ltd.) at 12,000 rpm for an hour, and subsequently mixed with ion-exchanged water to provide 1.87 kg of an aqueous dispersion sol (ST-1) of surface-treated metal oxide fine particles or fine particles of titanium-containing metal oxide having the (b) intermediate layer having a solid content concentration of 10% by weight.

The fine particles contained in the aqueous dispersion sol of surface-treated metal oxide fine particles had a specific surface area of 144 $m^2/g$ and were constituted by rutile crystals having a crystallite size of 9.1 nm. The amount of solid acid was 0.180 mmol/g.

The contents of metal components in the surface-treated metal oxide fine particles were measured and the result in terms of oxide of each metal component was 82.6% by weight of $TiO_2$, 10.3% by weight of $SnO_2$, 4.9% by weight of $ZrO_2$, and 2.2% by weight of $K_2O$.

Preparation of Aqueous Dispersion Sol (CST-1) of Fine Particles of Core-Shell Type Inorganic Oxide Preparation of Aqueous Solution of Peroxyzirconic Acid A slurry containing a zirconium hydrate and having a pH of 8.5 was prepared by gradually adding aqueous ammonia containing 15.0% by weight of ammonia to 13.16 kg of an aqueous solution of zirconium oxychloride containing 2.0% by weight of zirconium oxychloride (manufactured by TAIYO KOKO CO., LTD.) in terms of $ZrO_2$. This slurry was subsequently filtrated and then washed with pure water to provide 2.50 kg of cake having a zirconium content of 10.0% by weight in terms of $ZrO_2$.

Subsequently, 72.0 g of this cake was mixed with 0.65 kg of pure water, further mixed with 43.2 g of an aqueous solution of potassium hydroxide containing 10.0% by weight of potassium hydroxide (manufactured by KANTO CHEMICAL CO., INC.) to provide an alkaline solution, then mixed with 144.0 g of aqueous hydrogen peroxide containing 35.0% by weight of hydrogen peroxide, heated at 50° C. to dissolve the cake, and further mixed with 0.53 kg of pure water to provide 1.44 kg of an aqueous solution of peroxyzirconic acid containing 0.5% by weight of peroxyzirconic acid in terms of $ZrO_2$. The aqueous solution of peroxyzirconic acid had a pH of 12.

Preparation of Silicic Acid Solution

A commercially available water glass (manufactured by AGC Si-Tech Co., Ltd., 0.31 kg) was diluted with pure water and then subjected to dealkalization with a cation-exchange resin (manufactured by Mitsubishi Chemical Corporation) to provide 3.00 kg of an aqueous solution of silicic acid containing 2.0% by weight of silicic acid in terms of $SiO_2$. The aqueous solution of silicic acid had a pH of 2.3.

Preparation of Aqueous Dispersion Sol (CST-1) of Fine Particles of Core-Shell Type Inorganic Oxide The aqueous dispersion sol ST-1 (1.80 kg, solid content of 2.0% by weight) of surface-treated metal oxide fine particles or fine particles of titanium-containing metal oxide having the (b) intermediate layer, that was prepared above was mixed with 3.30 kg of pure water, stirred, and heated at 90° C. The aqueous solution of peroxyzirconic acid (1.44 kg) and 1.08 kg of the aqueous solution of silicic acid were then gradually added to the resultant mixture. After the addition was completed, the resultant mixture was aged for an hour while maintained at 90° C. under stirring. At this time, the amount of a composite oxide covering the surface-treated particles was 25 parts by weight with respect to 100 parts by weight of the surface-treated particles.

The resultant mixture was then heated in an autoclave (50 L, manufactured by Taiatsu Techno Corporation) at 165° C. for 18 hours.

The resultant mixture was then cooled to room temperature and subsequently concentrated with an ultrafiltration membrane (SIP-1013, manufactured by Asahi Kasei Corporation) to prepare an aqueous dispersion sol having a solid content of 10.0% by weight.

Thus, 0.64 kg of an aqueous dispersion sol containing metal oxide fine particles in which the surfaces of the surface-treated metal oxide fine particles or fine particles of titanium-containing metal oxide having the (b) intermediate layer were covered with a composite oxide containing silicon and zirconium (hereafter, referred to as "CST-1") was obtained.

The thus-obtained aqueous dispersion sol containing metal oxide fine particles was a transparent milk-white sol.

The contents of metal components in the metal oxide fine particles were measured and the result in terms of oxide of each metal component was 65.2% by weight of $TiO_2$, 8.0% by weight of $SnO_2$, 13.9% by weight of $SiO_2$, 9.4% by weight of $ZrO_2$, and 3.3% by weight of $K_2O$. The metal oxide fine particles had an average particle diameter of 19 nm, a specific surface area of 172 $m^2/g$, and a charge density of 1.37 $\mu eq/m^2$. The amount of solid acid was 0.034 mmol/g.

Of the measurement results, some data mainly relating to the present invention are described in Table 1.

Preparation of Methanol Dispersion Sol (CST-1-M) of Fine Particles of Core-Shell Type Inorganic Oxide A deionized aqueous dispersion liquid of core-shell composite oxide fine particles was prepared by mixing the 0.64 kg of the aqueous dispersion liquid (CST-1) of core-shell composite oxide fine particles prepared above with 9.6 g of a cation-exchange resin under stirring and then removing the resin. The deionized aqueous dispersion liquid of core-shell composite oxide fine particles was then added to 0.64 kg of a methanol solution under stirring in which 42.9 g of tetraethoxysilane (manufactured by TAMA CHEMICALS CO., LTD.) serving as a surface-treatment agent was dissolved, and then heated at 50° C. for 6 hours.

The resultant solution was cooled and then subjected to replacement of the dispersion medium from water to methanol (manufactured by HAYASHI PURE CHEMICAL IND., LTD.; methyl alcohol concentration: 99.9% by weight) with an ultrafiltration membrane apparatus (filtration membrane SIP-1013, manufactured by Asahi Kasei Corporation) to provide 0.32 kg of a methanol dispersion liquid (CST-1-M) of fine particles of core-shell type inorganic oxide. As a result, the thus-obtained methanol dispersion liquid had a solid content concentration of about 30% by weight and a water content of about 0.3% by weight.

The negative charge per unit surface area of the fine particles of core-shell type inorganic oxide was 1.32 $\mu eq/m^2$.

The methanol dispersion liquid of fine particles of core-shell type inorganic oxide was subjected to the photocatalytic activity test; it was found to have a fade change ratio (%) of 2% and evaluated as Good. Furthermore, it was subjected to the light resistance evaluation and it was evaluated as Good.

Preparation of Coating Composition (H1) for Forming Hardcoat Layer Film

A vessel was provided that contained a mixture of 89.2 g of γ-glycidoxypropyltrimethoxysilane (Z-6040, manufactured by Dow Corning Toray Co., Ltd.) and 15.8 g of methanol (manufactured by HAYASHI PURE CHEMICAL IND., LTD.; methyl alcohol concentration: 99.9% by weight); and 30.4 g of a 0.01 N aqueous solution of hydrochloric acid was dropped into the mixture under stirring. The resultant mixture was further stirred at room temperature for a whole day and night to hydrolyze the silane compound.

Subsequently, to the vessel containing the hydrolyzed solution, 131.5 g of methanol, 300.2 g of the methanol dispersion liquid (CST-1-M) of core-shell composite oxide fine particles that was prepared above and had a solid content concentration of 30% by weight, 24.2 g of propylene glycol monomethyl ether (manufactured by The Dow Chemical Company), 1.8 g of tris(2,4-pentanedionate)aluminum III (manufactured by TOKYO CHEMICAL INDUSTRY CO., LTD.), and 0.2 g of a silicone surfactant (L-7001, manufactured by Dow Corning Toray Co., Ltd.) serving as a leveling agent were added. The resultant mixture was stirred at room temperature for a whole day and night to prepare a coating composition (H1) for forming a hardcoat layer film serving as a coating composition for an optical base material.

Preparation of Coating Composition (H10) for Forming Hardcoat Layer Film

A vessel was provided that contained a mixture of 79.2 g of γ-glycidoxypropyltrimethoxysilane (Z-6040, manufactured by Dow Corning Toray Co., Ltd.) and 14.0 g of methanol (manufactured by HAYASHI PURE CHEMICAL IND., LTD.; methyl alcohol concentration: 99.9% by weight); and 27.0 g of a 0.01 N aqueous solution of hydrochloric acid was dropped into the mixture under stirring. The resultant mixture was further stirred at room temperature for a whole day and night to hydrolyze the silane compound.

Subsequently, to the vessel containing the hydrolyzed solution, 113.8 g of methanol, 333.4 g of the methanol dispersion liquid (CST-1-M) of core-shell composite oxide fine particles that was prepared above and had a solid content concentration of 30% by weight, 24.2 g of propylene glycol monomethyl ether (manufactured by The Dow Chemical Company), 1.8 g of tris(2,4-pentanedionate)aluminum III (manufactured by TOKYO CHEMICAL INDUSTRY CO., LTD.), and 0.7 g of a silicone surfactant (L-7001, manufactured by Dow Corning Toray Co., Ltd.) serving as a leveling agent were added. The resultant mixture was stirred at room temperature for a whole day and night to prepare a coating composition (H10) for forming a hardcoat layer film serving as a coating composition for an optical base material.

Preparation of Coating Composition (P1) for Forming Primer Layer Film

A vessel was provided that contained 162.8 g of a commercially available thermoplastic resin, a polyurethane emulsion "SUPERFLEX 150" (manufactured by DAI-ICHI KOGYO SEIYAKU CO., LTD.; aqueous dispersion urethane elastomer having a solid content of 30%). This emulsion was mixed with 206.7 g of the methanol dispersion liquid (CST-1-M) of fine particles of core-shell type inorganic oxide and 96.9 g of ion-exchanged water and stirred for an hour.

The resultant mixture was then mixed with 528.8 g of methanol (manufactured by HAYASHI PURE CHEMICAL IND., LTD.; methyl alcohol concentration: 99.9% by weight) and 0.3 g of a silicone surfactant (L-7604, manufactured by Dow Corning Toray Co., Ltd.) serving as a leveling agent and stirred at room temperature for a whole day and night to prepare a coating composition (P1) for forming a primer layer film.

Preparation of Coating Composition (P2) for Forming Primer Layer Film

A vessel was provided that contained 140.0 g of a commercially available thermoplastic resin, a polyurethane emulsion "SUPERFLEX 150" (manufactured by DAI-ICHI KOGYO SEIYAKU CO., LTD.; aqueous dispersion urethane elastomer having a solid content of 30%). This emulsion was mixed with 229.5 g of the methanol dispersion liquid (CST-1-M) of fine particles of core-shell type inorganic oxide and 96.9 g of ion-exchanged water and stirred for an hour.

The resultant mixture was then mixed with 531.1 g of methanol (manufactured by HAYASHI PURE CHEMICAL IND., LTD.; methyl alcohol concentration: 99.9% by weight) and 0.3 g of a silicone surfactant (L-7604, manufactured by Dow Corning Toray Co., Ltd.) serving as a leveling agent and stirred at room temperature for a whole day and night to prepare a coating composition (P2) for forming a primer layer film.

Example 2

Preparation of Aqueous Dispersion Sol (ST-2) of Surface-Treated Metal Oxide Fine Particles An aqueous dispersion sol (ST-2, 1.87 kg) of surface-treated metal oxide fine particles or fine particles of titanium-containing metal oxide having the (b) intermediate layer that had a solid content concentration of 10% by weight was prepared by the same method as in Example 1 except that, in the step of preparing the aqueous dispersion sol (ST-1) of surface-treated metal oxide fine particles in Example 1, instead of gradually adding 1.53 kg of the aqueous solution of zirconium oxychloride octahydrate having a concentration of 3.6% in terms of $ZrO_2$ by weight, 0.31 kg of an aqueous solution of zirconium oxychloride octahydrate having a concentration of 3.6% in terms of $ZrO_2$ by weight was gradually added. At this time, the zirconium content in terms of oxide with respect to the metal elements contained in the core fine particles was 1.0% by mol.

The fine particles contained in the aqueous dispersion sol of surface-treated metal oxide fine particles or fine particles of titanium-containing metal oxide having the (b) intermediate layer had a specific surface area of 144 $m^2/g$ and were constituted by rutile crystals having a crystallite diameter of 9.9 nm. The amount of solid acid was 0.146 mmol/g.

The contents of metal components in the surface-treated metal oxide fine particles were measured and the result in terms of oxide of each metal component was 86.1% by weight of $TiO_2$, 10.4% by weight of $SnO_2$, 1.5% by weight of $ZrO_2$, and 2.0% by weight of $K_2O$.

No crystalline peaks derived from zirconium were detected in an XRD pattern of the calcined powder of the surface-treated metal oxide fine particles. Accordingly, it was found that zirconium in the form of an oxide and/or a hydrate having an amorphous structure covered the core particles.

Preparation of Aqueous Dispersion Sol (CST-2) of Fine Particles of Core-Shell Type Inorganic Oxide An aqueous dispersion sol (CST-2, 0.64 kg) of fine particles of core-shell type inorganic oxide having a solid content concentration of 10% by weight was prepared by the same method as in Example 1 except that, in the step of preparing the aqueous dispersion sol (CST-1) of fine particles of core-shell type inorganic oxide in Example 1, instead of using 1.80 kg of the aqueous dispersion sol (ST-1) of surface-treated metal oxide fine particles or fine particles of titanium-containing metal oxide having the (b) intermediate layer having a solid content concentration of 10% by weight, 1.80 kg of the aqueous dispersion sol (ST-2) of surface-treated metal oxide fine particles or fine particles of titanium-containing metal oxide having the (b) intermediate layer having a solid content concentration of 10% by weight was used.

The thus-obtained aqueous dispersion sol containing metal oxide fine particles was a transparent milk-white sol.

The contents of metal components in the metal oxide fine particles were measured and the result in terms of oxide of each metal component was 68.4% by weight of $TiO_2$, 8.3% by weight of $SnO_2$, 15.2% by weight of $SiO_2$, 5.2% by weight of $ZrO_2$, and 2.9% by weight of $K_2O$. The metal oxide fine particles had an average particle diameter of 19 nm, a specific surface area of 175 $m^2/g$, and a charge density of 1.29 μeq/$m^2$. The amount of solid acid was 0.028 mmol/g.

Of the measurement results, some data mainly relating to the present invention are described in Table 1.

Preparation of Methanol Dispersion Sol (CST-2-M) of Fine Particles of Core-shell Type Inorganic Oxide A methanol dispersion sol (CST-2-M, 0.32 kg) of fine particles of core-shell type inorganic oxide having a solid content concentration of 20% by weight was prepared by the same method as in Example 1 except that, in the step of preparing the methanol dispersion sol (CST-1-M) of fine particles of core-shell type inorganic oxide in Example 1, instead of using 0.64 kg of the aqueous dispersion sol (CST-1) of fine particles of core-shell type inorganic oxide having a solid content concentration of 10% by weight, 0.64 kg of the aqueous dispersion sol (CST-2) of fine particles of core-shell type inorganic oxide having a solid content concentration of 10% by weight was used.

Preparation of Coating Composition (H2) for Forming Hardcoat Layer Film

A coating composition (H2) for forming a hardcoat layer film was prepared by the same method as in the preparation of the coating composition (H1) for forming a hardcoat layer film in Example 1 except that, in the step of preparing the coating composition (H1) for forming a hardcoat layer film in Example 1, instead of using 300.2 g of the methanol dispersion liquid (CST-1-M) of fine particles of core-shell type inorganic oxide, 297.9 g of the methanol dispersion liquid (CST-2-M) of core-shell composite oxide fine particles was used.

Example 3

Preparation of Aqueous Dispersion Sol (ST-3) of Surface-treated Metal Oxide Fine Particles An aqueous dispersion sol (ST-3, 1.87 kg) of surface-treated metal oxide fine particles or fine particles of titanium-containing metal oxide having the (b) intermediate layer that had a solid content concentration of 10% by weight was prepared by the same method as in Example 1 except that, in the step of preparing the aqueous dispersion sol (ST-1) of surface-treated metal oxide fine particles or fine particles of titanium-containing metal oxide having the (b) intermediate layer in Example 1, instead of gradually adding 1.53 kg of the aqueous solution of zirconium oxychloride octahydrate having a concentration of 3.6% in terms of $ZrO_2$ by weight, 3.06 kg of an aqueous solution of zirconium oxychloride octahydrate having a concentration of 3.6% in terms of $ZrO_2$ by weight was gradually added. At this time, the zirconium content in terms of oxide with respect to the metal elements contained in the core fine particles was 10.0% by mol.

The fine particles contained in the aqueous dispersion sol of surface-treated metal oxide fine particles had a specific surface area of 158 $m^2/g$ and were constituted by rutile crystals having a crystallite diameter of 8.6 nm. The amount of solid acid was 0.151 mmol/g.

The contents of metal components in the surface-treated metal oxide fine particles were measured and the result in terms of oxide of each metal component was 75.2% by weight of $TiO_2$, 9.1% by weight of $SnO_2$, 13.6% by weight of $ZrO_2$, and 2.1% by weight of $K_2O$, No crystalline peaks derived from zirconium were detected in an XRD pattern of the calcined powder of the surface-treated metal oxide fine particles. Accordingly, it was found that zirconium in the form of an oxide and/or a hydrate having an amorphous structure covered the core particles.

Preparation of Aqueous Dispersion Sol (CST-3) of Fine Particles of Core-Shell Type Inorganic Oxide An aqueous dispersion sol (CST-3, 0.64 kg) of fine particles of core-shell type inorganic oxide having a solid content concentration of 10% by weight was prepared by the same method as in Example 1 except that, in the step of preparing the aqueous dispersion sol (CST-1) of fine particles of core-shell type inorganic oxide in Example 1, instead of using 1.80 kg of the aqueous dispersion sol (ST-1) of surface-treated metal oxide fine particles or fine particles of titanium-containing metal oxide having the (b) intermediate layer having a solid content concentration of 10% by weight, 1.80 kg of the aqueous dispersion sol (ST-3) of surface-treated metal oxide fine particles or fine particles of titanium-containing metal oxide having the (b) intermediate layer having a solid content concentration of 10% by weight was used.

The thus-obtained aqueous dispersion sol containing metal oxide fine particles was a transparent milk-white sol.

The contents of metal components in the metal oxide fine particles were measured and the result in terms of oxide of each metal component was 59.7% by weight of $TiO_2$, 7.3% by weight of $SnO_2$, 15.2% by weight of $SiO_2$, 14.9% by weight of $ZrO_2$, and 2.9% by weight of $K_2O$. The metal oxide fine particles had an average particle diameter of 19 nm, a specific surface area of 163 $m^2/g$, and a charge density of 1.48 μeq/$m^2$. The amount of solid acid was 0.029 mmol/g.

Of the measurement results, some data mainly relating to the present invention are described in Table 1.

Preparation of Methanol Dispersion Sol (CST-3-M) of Fine Particles of Core-Shell Type Inorganic Oxide A methanol dispersion sol (CST-3-M, 0.32 kg) of fine particles of core-shell type inorganic oxide having a solid content concentration of 20% by weight was prepared by the same method as in Example 1 except that, in the step of preparing the methanol dispersion sol (CST-1-M) of fine particles of core-shell type inorganic oxide in Example 1, instead of using 0.64 kg of the aqueous dispersion sol (CST-1) of fine particles of core-shell type inorganic oxide having a solid content concentration of 10% by weight, 0.64 kg of the aqueous dispersion sol (CST-3) of fine particles of core-shell type inorganic oxide having a solid content concentration of 10% by weight was used.

Preparation of Coating Composition (H3) for Forming Hardcoat Layer Film

A coating composition (H3) for forming a hardcoat layer film was prepared by the same method as in the preparation of the coating composition (H1) for forming a hardcoat layer film in Example 1 except that, in the step of preparing the coating composition (H1) for forming a hardcoat layer film in Example 1, instead of using 300.2 g of the methanol dispersion liquid (CST-1-M) of fine particles of core-shell type inorganic oxide, 300.6 g of the methanol dispersion liquid (CST-3-M) of core-shell composite oxide fine particles was used.

Example 4

Preparation of Aqueous Dispersion Sol (ST-4) of Surface-Treated Metal Oxide Fine Particles An aqueous dispersion sol (ST-4, 1.87 kg) of surface-treated metal oxide fine particles or fine particles of titanium-containing metal oxide having the (b) intermediate layer that had a solid content concentration of 10% by weight was prepared by the same method as in Example 1 except that, in the step of preparing the aqueous dispersion sol (ST-1) of surface-treated metal oxide fine particles or fine particles of titanium-containing metal oxide having the (b) intermediate layer in Example 1, instead of gradually adding 1.53 kg of the aqueous solution of zirconium oxychloride octahydrate having a concentration of 3.6% in terms of $ZrO_2$ by weight, 0.66 kg of an aqueous solution of potassium stannate trihydrate having a concentration of 9.9% in terms of $SnO_2$ by weight was gradually added. At this time, the tin content in terms of oxide with respect to the metal elements contained in the core fine particles was 5.0% by mol.

The fine particles contained in the aqueous dispersion sol of surface-treated metal oxide fine particles had a specific surface area of 147 $m^2/g$ and were constituted by rutile crystals having a crystallite diameter of 8.6 nm. The amount of solid acid was 0.050 mmol/g.

The contents of metal components in the surface-treated metal oxide fine particles were measured and the result in terms of oxide of each metal component was 80.2% by weight of $TiO_2$, 16.2% by weight of $SnO_2$, and 3.6% by weight of $K_2O$.

Only crystalline peaks derived from the rutile structure of the core particles were detected in an XRD pattern of the calcined powder of the surface-treated metal oxide fine particles. Accordingly, it was found that tin in the form of an oxide and/or a hydrate having an amorphous structure covered the core particles.

Preparation of Aqueous Dispersion Sol (CST-4) of Fine Particles of Core-Shell Type Inorganic Oxide An aqueous dispersion sol (CST-4, 0.64 kg) of fine particles of core-shell type inorganic oxide having a solid content concentration of 10% by weight was prepared by the same method as in Example 1 except that, in the step of preparing the aqueous dispersion sol (CST-1) of fine particles of core-shell type inorganic oxide in Example 1, instead of using 1.80 kg of the aqueous dispersion sol (ST-1) of surface-treated metal oxide fine particles or fine particles of titanium-containing metal oxide having the (b) intermediate layer having a solid content concentration of 10% by weight, 1.80 kg of the aqueous dispersion sol (ST-4) of surface-treated metal oxide fine particles or fine particles of titanium-containing metal oxide having the (b) intermediate layer having a solid content concentration of 10% by weight was used.

Thus-obtained aqueous dispersion sol containing metal oxide fine particles was a transparent milk-white sol.

The contents of metal components in the metal oxide fine particles were measured and the result in terms of oxide of each metal component was 63.4% by weight of $TiO_2$, 12.8% by weight of $SnO_2$, 15.9% by weight of $SiO_2$, 3.3% by weight of $ZrO_2$, and 4.6% by weight of $K_2O$. The metal oxide fine particles had an average particle diameter of 19 nm, a specific surface area of 175 $m^2/g$, and a charge density of 1.11 μeq/$m^2$. The amount of solid acid was 0.009 mmol/g.

Of the measurement results, some data mainly relating to the present invention are described in Table 1.

Preparation of Methanol Dispersion Sol (CST-4-M) of Fine Particles of Core-Shell Type Inorganic Oxide A methanol dispersion sol (CST-4-M, 0.32 kg) of fine particles of core-shell type inorganic oxide having a solid content concentration of 20% by weight was prepared by the same method as in Example 1 except that, in the step of preparing the methanol dispersion sol (CST-1-M) of fine particles of core-shell type inorganic oxide in Example 1, instead of using 0.64 kg of the aqueous dispersion sol (CST-1) of fine particles of core-shell type inorganic oxide having a solid content concentration of 10% by weight, 0.64 kg of the aqueous dispersion sol (CST-4) of fine particles of core-shell type inorganic oxide having a solid content concentration of 10% by weight was used.

Preparation of Coating Composition (H4) for Forming Hardcoat Layer Film

A coating composition (H4) for forming a hardcoat layer film was prepared by the same method as in the preparation of the coating composition (H1) for forming a hardcoat layer film in Example 1 except that, in the step of preparing the coating composition (H1) for forming a hardcoat layer film in Example 1, instead of 300.2 g of the methanol dispersion liquid (CST-1-M) of fine particles of core-shell type inorganic oxide, 296.7 g of the methanol dispersion liquid (CST-4-M) of core-shell composite oxide fine particles was used.

Example 5

Preparation of Aqueous Dispersion Sol (P-2) of Core Fine Particles

A white slurry having a pH of 9.5 was prepared by mixing 6.56 kg of an aqueous solution of titanium tetrachloride containing 7.75% by weight of titanium tetrachloride (manufactured by OSAKA Titanium technologies Co., Ltd.) in terms of $TiO_2$ and 2.54 kg of aqueous ammonia containing 15% by weight of ammonia (manufactured by Ube Industries, Ltd.). This slurry was then filtrated and subsequently washed with ion-exchanged water to provide 5.35 kg of water-containing titanic acid cake having a solid content of 10% by weight.

The cake was subsequently mixed with 6.12 kg of aqueous hydrogen peroxide containing 35% by weight of hydrogen peroxide (manufactured by MITSUBISHI GAS CHEMICAL COMPANY, INC.) and 20.00 kg of ion-exchanged water, then heated at 80° C. for an hour under stirring, and further mixed with 22.04 kg of ion-exchanged water to provide 53.51 kg of an aqueous solution of peroxytitanic acid containing 1% by weight of peroxytitanic acid in terms of $TiO_2$. This aqueous solution of peroxytitanic acid was a transparent yellow-brown solution having a pH of 8.5.

Subsequently, 53.51 kg of the aqueous solution of peroxytitanic acid was mixed with 2.60 kg of a cation-exchange resin (manufactured by Mitsubishi Chemical Corporation). An aqueous solution (6.69 kg) of potassium stannate containing 1% by weight of potassium stannate (manufactured by Showa Kako Corporation) in terms of $SnO_2$ was gradually added to the resultant mixture under stirring.

The cation-exchange resin having captured potassium ions and the like was then removed. After that, the resultant mixture was mixed with 0.65 kg of silica sol containing 15% by weight of silica fine particles having an average particle diameter of 7 nm (manufactured by JGC Catalysts and Chemicals Ltd.) and 9.15 kg of ion-exchanged water, and heated with an autoclave (120 L, manufactured by Taiatsu Techno Corporation) at 165° C. for 18 hours.

The resultant aqueous mixture was then cooled to room temperature and subsequently concentrated with an ultrafiltration membrane apparatus (ACV-3010, manufactured by Asahi Kasei Corporation) to provide 7.00 kg of an aqueous dispersion sol of core fine particles having a solid content of 10% by weight.

Thus-obtained aqueous dispersion sol containing metal oxide fine particles was a transparent milk-white sol.

The contents of metal components in the metal oxide fine particles were measured and the result in terms of oxide of each metal component was 71.9% by weight of $TiO_2$, 9.1% by weight of $SnO_2$, 17.4% by weight of $SiO_2$, and 1.6% by weight of $K_2O$. The metal oxide fine particles had an average particle diameter of 13 nm, a specific surface area of 218 $m^2/g$, and a charge density of 1.147 μeq/$m^2$. The metal oxide fine particles were measured by X-ray diffraction and found to be constituted by rutile crystals having a crystallite diameter of 7.1 nm.

Preparation of Aqueous Dispersion Sol (ST-5) of Surface-treated Metal Oxide Fine Particles An aqueous dispersion sol (ST-5, 1.87 kg) of surface-Treated metal oxide fine particles or fine particles of titanium-containing metal oxide having the (b) intermediate layer that had a solid content concentration of 10% by weight was prepared by the same method as in Example 1 except that, in the step of preparing the aqueous dispersion sol (ST-1) of surface-treated metal oxide fine particles or fine particles of titanium-containing metal oxide having the (b) intermediate layer in Example 1, instead of using 7.00 kg of the aqueous dispersion sol (P-1) of core fine particles, 7.00 kg of the aqueous dispersion sol (P-2) of core fine particles was used.

The fine particles contained in the aqueous dispersion sol of surface-treated metal oxide fine particles had a specific surface area of 192 $m^2/g$ and were constituted by rutile crystals having a crystallite diameter of 8.9 nm. The amount of solid acid was 0.112 mmol/g.

The contents of metal components in the surface-treated metal oxide fine particles were measured and the result in terms of oxide of each metal component was 67.0% by weight of $TiO_2$, 8.4% by weight of $SnO_2$, 18.3% by weight of $SiO_2$, 4.8% by weight of $ZrO_2$, and 1.5% by weight of $K_2O$, No crystalline peaks derived from zirconium were detected in an XRD pattern of the calcined powder of the surface-treated metal oxide fine particles. Accordingly, it was found that zirconium in the form of an oxide and/or a hydrate having an amorphous structure covered the core particles.

Preparation of Aqueous Dispersion Sol (CST-5) of Fine Particles of Core-shell Type Inorganic Oxide An aqueous dispersion sol (CST-5, 0.64 kg) of fine particles of core-shell type inorganic oxide having a solid content concentration of 10% by weight was prepared by the same method as in Example 1 except that, in the step of preparing the aqueous dispersion sol (CST-1) of fine particles of core-shell type inorganic oxide in Example 1, instead of using 1.80 kg of the aqueous dispersion sol (ST-1) of surface-treated metal oxide fine particles or fine particles of titanium-containing metal oxide having the (b) intermediate layer having a solid content concentration of 10% by weight, 1.80 kg of the aqueous dispersion sol (ST-5) of surface-treated metal oxide fine particles or fine particles of titanium-containing metal oxide having the (b) intermediate layer having a solid content concentration of 10% by weight was used.

The thus-obtained aqueous dispersion sol containing metal oxide fine particles was a transparent milk-white sol.

The contents of metal components in the metal oxide fine particles were measured and the result in terms of oxide of each metal component was 53.6% by weight of $TiO_2$, 6.7% by weight of $SnO_2$, 29.7% by weight of $SiO_2$, 7.5% by weight of $ZrO_2$, and 2.6% by weight of $K_2O$. The metal oxide fine particles had an average particle diameter of 14 nm, a specific surface area of 221 $m^2$/g, and a charge density of 1.17 μeq/$m^2$. The amount of solid acid was 0.021 mmol/g.

Of the measurement results, some data mainly relating to the present invention are described in Table 1.

Preparation of Methanol Dispersion Sol (CST-5-M) of Fine Particles of Core-Shell Type Inorganic Oxide A methanol dispersion sol (CST-5-M, 0.32 kg) of fine particles of core-shell type inorganic oxide having a solid content concentration of 20% by weight was prepared by the same method as in Example 1 except that, in the step of preparing the methanol dispersion sol (CST-1-M) of fine particles of core-shell type inorganic oxide in Example 1, instead of using 0.64 kg of the aqueous dispersion sol (CST-1) of fine particles of core-shell type inorganic oxide having a solid content concentration of 10% by weight, 0.64 kg of the aqueous dispersion sol (CST-5) of fine particles of core-shell type inorganic oxide having a solid content concentration of 10% by weight was used.

Preparation of Coating Composition (H5) for Forming Hardcoat Layer Film

A coating composition (H5) for forming a hardcoat layer film was prepared by the same method as in the preparation of the coating composition (H1) for forming a hardcoat layer film in Example 1 except that, in the step of preparing the coating composition (H1) for forming a hardcoat layer film in Example 1, instead of using 300.2 g of the methanol dispersion liquid (CST-1-M) of fine particles of core-shell type inorganic oxide, 314.5 g of the methanol dispersion liquid (CST-5-M) of core-shell composite oxide fine particles was used.

Example 6

Preparation of Aqueous Dispersion Sol (CST-6) of Fine Particles of Core-Shell Type Inorganic Oxide
Preparation of Silicic Acid Solution A commercially available water glass (manufactured by AGC Si-Tech Co., Ltd., 0.31 kg) was diluted with pure water and then subjected to dealkalization with a cation-exchange resin (manufactured by Mitsubishi Chemical Corporation) to provide 3.00 kg of a solution of silicic acid containing 2.0% by weight of silicic acid in terms of $SiO_2$. The solution of silicic acid had a pH of 2.3.

Step (1)

An aqueous dispersion sol (ST-1, 1.80 kg, solid content of 10.0% by weight) of surface-treated metal oxide fine particles or fine particles of titanium-containing metal oxide having the (b) intermediate layer prepared in the same manner as in Example 1 was mixed with 4.74 kg of ion-exchanged water, and heated at 90° C. under stirring. Subsequently, to the resultant sol, 1.08 kg of the silicic acid solution and 1.07 kg of a 0.67% by weight aqueous solution of sodium aluminate in terms of $Al_2O_3$ were simultaneously gradually added over 4 hours and the resultant mixture was mixed. When the silicon component in the silicic acid solution is represented by $SiO_2$ and the aluminum component in the aqueous solution of sodium aluminate is represented by $Al_2O_3$, the weight ratio of the silicon component to the aluminum component in terms of oxides was $SiO_2/Al_2O_3$=4.0. The amount of the shells covering the core fine particles was 25 parts by weight with respect to 100 parts by weight of the core fine particles.

Step (2)

The mixture prepared in the Step (1) was stirred for an hour while the temperature thereof was maintained at 90° C. to provide an aqueous dispersion liquid of fine particles of core-shell type inorganic oxide in which surface-treated metal oxide fine particles or fine particles of titanium-containing metal oxide having the (b) intermediate layer were covered with a composite oxide of silicon and aluminum.

Step (3)

The aqueous dispersion liquid of fine particles of core-shell type inorganic oxide obtained in the Step (2) was subsequently mixed with 0.06 kg of a cation-exchange resin (DIAION SK1BH, manufactured by Mitsubishi Chemical Corporation) so as to have a pH of 3.5, and then, without removing the resin, aged for 7 hours while maintained at 80° C. under stirring. After that, the cation-exchange resin was separated and removed with a stainless steel filter having 44-μm openings to provide 7.62 kg of an aqueous dispersion liquid of fine particles of core-shell type inorganic oxide having a solid content of 0.85% by weight.

Thus-obtained aqueous dispersion liquid of core-shell composite oxide fine particles was then cooled to room temperature and subsequently concentrated with an ultrafiltration membrane (SIP-1013, manufactured by Asahi Kasei Corporation) to prepare 1.07 kg of an aqueous dispersion liquid (hereafter, referred to as "CST-6") of core-shell composite oxide fine particles that had a solid content of 10.0% by weight.

The contents of metal elements in the fine particles of core-shell type inorganic oxide contained in the aqueous dispersion liquid (CST-6) of fine particles of core-shell type inorganic oxide were measured and the result in terms of oxide of each metal element was 67.1% by weight of $TiO_2$, 8.7% by weight of $SnO_2$, 4.9% by weight of $ZrO_2$, 17.0% by weight of $SiO_2$, 1.8% by weight of $Al_2O_3$, 0.4% by weight of $Na_2O$, and 0.2% by weight of $K_2O$. The shells had a $SiO_2/Al_2O_3$ of 6.6. The fine particles of core-shell type inorganic oxide had an average particle diameter of 19 nm, a specific surface area of 172 $m^2$/g, and a charge density of 1.37 μeq/$m^2$. The amount of solid acid was 0.034 mmol/g.

Preparation of Methanol Dispersion Sol (CST-6-M) of Fine Particles of Core-Shell Type Inorganic Oxide A methanol dispersion sol (CST-6-M, 0.32 kg) of fine particles of core-shell type inorganic oxide having a solid content concentration of 20% by weight was prepared by the same method as in Example 1 except that, in the step of preparing the methanol dispersion sol (CST-1-M) of fine particles of core-shell type inorganic oxide in Example 1, instead of using 0.64 kg of the aqueous dispersion sol (CST-1) of fine particles of core-shell type inorganic oxide having a solid content concentration of 10% by weight, 0.64 kg of the aqueous dispersion sol (CST-6) of fine particles of core-shell type inorganic oxide having a solid content concentration of 10% by weight was used.

Preparation of Coating Composition (H6) for Forming Hardcoat Layer Film

A coating composition (H6) for forming a hardcoat layer film was prepared by the same method as in the preparation of the coating composition (H1) for forming a hardcoat layer film in Example 1 except that, in the step of preparing the coating composition (H1) for forming a hardcoat layer film in Example 1, instead of using 300.2 g of the methanol dispersion liquid (CST-1-M) of fine particles of core-shell type inorganic oxide, 281.3 g of the methanol dispersion liquid (CST-6-M) of core-shell composite oxide fine particles was used.

Example 7

Preparation of Aqueous Dispersion Sol (ST-7) of Surface-Treated Metal Oxide Fine Particles An aqueous dispersion sol (ST-7, 1.87 kg) of surface-treated metal oxide fine particles or fine particles of titanium-containing metal oxide having the (b) intermediate layer that had a solid content concentration of 10% by weight was prepared by the same method as in Example 4 except that, in the step of preparing the aqueous dispersion sol (ST-4) of surface-treated metal oxide fine particles or fine particles of titanium-containing metal oxide having the (b) intermediate layer in Example 4, instead of using 7.00 kg of the aqueous dispersion sol (P-1) of core fine particles, 7.00 kg of the aqueous dispersion sol (P-2) of core fine particles was used.

The fine particles contained in the aqueous dispersion sol of surface-treated metal oxide fine particles had a specific surface area of 218 m$^2$/g and were constituted by rutile crystals having a crystallite diameter of 7.1 nm. The amount of solid acid was 0.048 mmol/g.

The contents of metal components in the surface-treated metal oxide fine particles were measured and the result in terms of oxide of each metal component was 67.0% by weight of TiO$_2$, 13.2% by weight of SnO$_2$, 18.3% by weight of SiO$_2$, and 1.5% by weight of K$_2$O.

Only crystalline peaks derived from the rutile structure of the core particles were detected in an XRD pattern of the calcined powder of the surface-treated metal oxide fine particles. Accordingly, it was found that tin in the form of an oxide and/or a hydrate having an amorphous structure covered the core particles.

Preparation of Aqueous Dispersion Sol (CST-7) of Fine Particles of Core-Shell Type Inorganic Oxide An aqueous dispersion sol (CST-7, 0.64 kg) of fine particles of core-shell type inorganic oxide having a solid content concentration of 10% by weight was prepared by the same method as in Example 1 except that, in the step of preparing the aqueous dispersion sol (CST-1) of fine particles of core-shell type inorganic oxide in Example 1, instead of using 1.80 kg of the aqueous dispersion sol (ST-1) of surface-treated metal oxide fine particles or fine particles of titanium-containing metal oxide having the (b) intermediate layer having a solid content concentration of 10% by weight, 1.80 kg of the aqueous dispersion sol (ST-7) of surface-treated metal oxide fine particles or fine particles of titanium-containing metal oxide having the (b) intermediate layer having a solid content concentration of 10% by weight was used.

Thus-obtained aqueous dispersion sol containing metal oxide fine particles was a transparent milk-white sol.

The contents of metal components in the metal oxide fine particles were measured and the result in terms of oxide of each metal component was 53.6% by weight of TiO$_2$, 11.5% by weight of SnO$_2$, 29.7% by weight of SiO$_2$, 2.7% by weight of ZrO$_2$, and 2.55% by weight of K$_2$O. The metal oxide fine particles had an average particle diameter of 14 nm, a specific surface area of 220 m$^2$/g, and a charge density of 1.20 μeq/m$^2$. The amount of solid acid was 0.007 mmol/g.

Of the measurement results, some data mainly relating to the present invention are described in Table 1.

Preparation of Methanol Dispersion Sol (CST-7-M) of Fine Particles of Core-Shell Type Inorganic Oxide A methanol dispersion sol (CST-7-M, 0.32 kg) of fine particles of core-shell type inorganic oxide having a solid content concentration of 20% by weight was prepared by the same method as in Example 1 except that, in the step of preparing the methanol dispersion sol (CST-1-M) of fine particles of core-shell type inorganic oxide in Example 1, instead of using 0.64 kg of the aqueous dispersion sol (CST-1) of fine particles of core-shell type inorganic oxide having a solid content concentration of 10% by weight, 0.64 kg of the aqueous dispersion sol (CST-7) of fine particles of core-shell type inorganic oxide having a solid content concentration of 10% by weight was used.

Preparation of Coating Composition (H7) for Forming Hardcoat Layer Film

A coating composition (H7) for forming a hardcoat layer film was prepared by the same method as in the preparation of the coating composition (H1) for forming a hardcoat layer film in Example 1 except that, in the step of preparing the coating composition (H1) for forming a hardcoat layer film in Example 1, instead of using 300.2 g of the methanol dispersion liquid (CST-1-M) of fine particles of core-shell type inorganic oxide, 315.4 g of the methanol dispersion liquid (CST-7-M) of core-shell composite oxide fine particles was used.

Example 8

Preparation of Aqueous Dispersion Sol (ST-8) of Surface-Treated Metal Oxide Fine Particles An aqueous dispersion sol (ST-8, 1.87 kg) of surface-treated metal oxide fine particles or fine particles of titanium-containing metal oxide having the (b) intermediate layer that had a solid content concentration of 10% by weight was prepared by the same method as in Example 7 except that, in the step of preparing the aqueous dispersion sol (ST-7) of surface-treated metal oxide fine particles or fine particles of titanium-containing metal oxide having the (b) intermediate layer in Example 7, instead of adding 0.70 kg of the aqueous solution of potassium stannate trihydrate, 1.40 kg of the aqueous solution of potassium stannate trihydrate was added.

The fine particles contained in the aqueous dispersion sol of surface-treated metal oxide fine particles had a specific surface area of 192 m$^2$/g and were constituted by rutile crystals having a crystallite diameter of 8.9 nm. The amount of solid acid was 0.046 mmol/g.

The contents of metal components in the surface-treated metal oxide fine particles were measured and the result in terms of oxide of each metal component was 63.3% by weight of TiO$_2$, 17.7% by weight of SnO$_2$, 15.6% by weight of SiO$_2$, and 3.2% by weight of K$_2$O.

Only crystalline peaks derived from the rutile structure of the core particles were detected in an XRD pattern of the calcined powder of the surface-treated metal oxide fine particles. Accordingly, it was found that tin in the form of an oxide and/or a hydrate having an amorphous structure covered the core particles.

Preparation of Aqueous Dispersion Sol (CST-8) of Fine Particles of Core-Shell Type Inorganic Oxide An aqueous dispersion sol (CST-8, 0.64 kg) of fine particles of core-shell type inorganic oxide having a solid content concentration of 10% by weight was prepared by the same method as in Example 1 except that, in the step of preparing the aqueous dispersion sol (CST-1) of fine particles of core-shell type inorganic oxide in Example 1, instead of using 1.80 kg of the aqueous dispersion sol (ST-1) of surface-treated metal oxide fine particles or fine particles of titanium-containing metal oxide having the (b) intermediate layer having a solid content concentration of 10% by weight, 1.80 kg of the aqueous dispersion sol (ST-8) of surface-treated metal oxide fine particles or fine particles of titanium-containing metal oxide having the (b) intermediate layer having a solid content concentration of 10% by weight was used.

Thus-obtained aqueous dispersion sol containing metal oxide fine particles was a transparent milk-white sol.

The contents of metal components in the metal oxide fine particles were measured and the result in terms of oxide of each metal component was 52.5% by weight of $TiO_2$, 10.5% by weight of $SnO_2$, 29.6% by weight of $SiO_2$, 2.7% by weight of $ZrO_2$, and 4.7% by weight of $K_2O$. The metal oxide fine particles had an average particle diameter of 14 nm, a specific surface area of 218 $m^2/g$, and a charge density of 1.22 $\mu eq/m^2$. The amount of solid acid was 0.006 mmol/g.

Of the measurement results, some data mainly relating to the present invention are described in Table 1.

Preparation of Methanol Dispersion Sol (CST-8-M) of Fine Particles of Core-Shell Type Inorganic Oxide A methanol dispersion sol (CST-8-M, 0.32 kg) of fine particles of core-shell type inorganic oxide having a solid content concentration of 20% by weight was prepared by the same method as in Example 1 except that, in the step of preparing the methanol dispersion sol (CST-1-M) of fine particles of core-shell type inorganic oxide in Example 1, instead of using 0.64 kg of the aqueous dispersion sol (CST-1) of fine particles of core-shell type inorganic oxide having a solid content concentration of 10% by weight, 0.64 kg of the aqueous dispersion sol (CST-8) of fine particles of core-shell type inorganic oxide having a solid content concentration of 10% by weight was used.

Preparation of Coating Composition (H8) for Forming Hardcoat Layer Film

A coating composition (H8) for forming a hardcoat layer film was prepared by the same method as in the preparation of the coating composition (H1) for forming a hardcoat layer film in Example 1 except that, in the step of preparing the coating composition (H1) for forming a hardcoat layer film in Example 1, instead of using 300.2 g of the methanol dispersion liquid (CST-1-M) of fine particles of core-shell type inorganic oxide, 317.0 g of the methanol dispersion liquid (CST-8-M) of core-shell composite oxide fine particles was used.

Example 9

Preparation of Aqueous Dispersion Sol (CST-9) of Fine Particles of Core-Shell Type Inorganic Oxide An aqueous dispersion sol (CST-9, 0.64 kg) of fine particles of core-shell type inorganic oxide having a solid content concentration of 10% by weight was prepared by the same method as in Example 1 except that, in the step of preparing the aqueous dispersion sol (CST-6) of fine particles of core-shell type inorganic oxide in Example 6, instead of using 1.80 kg of the aqueous dispersion sol (ST-1) of surface-treated metal oxide fine particles or fine particles of titanium-containing metal oxide having the (b) intermediate layer having a solid content concentration of 10% by weight, 1.80 kg of the aqueous dispersion sol (ST-7) of surface-treated metal oxide fine particles or fine particles of titanium-containing metal oxide having the (b) intermediate layer having a solid content concentration of 10% by weight was used.

Thus-obtained aqueous dispersion sol containing metal oxide fine particles was a transparent milk-white sol.

The contents of metal components in the metal oxide fine particles were measured and the result in terms of oxide of each metal component was 53.5% by weight of $TiO_2$, 11.8% by weight of $SnO_2$, 32.4% by weight of $SiO_2$, 1.8% by weight of $Al_2O_3$, 0.4% by weight of $Na_2O$, and 0.2% by weight of $K_2O$. The metal oxide fine particles had an average particle diameter of 14 nm, a specific surface area of 219 $m^2/g$, and a charge density of 1.22 $\mu eq/m^2$. The amount of solid acid was 0.008 mmol/g.

Of the measurement results, some data mainly relating to the present invention are described in Table 1.

Preparation of Methanol Dispersion Sol (CST-9-M) of Fine Particles of Core-Shell Type Inorganic Oxide A methanol dispersion sol (CST-9-M, 0.32 kg) of fine particles of core-shell type inorganic oxide having a solid content concentration of 20% by weight was prepared by the same method as in Example 1 except that, in the step of preparing the methanol dispersion sol (CST-1-M) of fine particles of core-shell type inorganic oxide in Example 1, instead of using 0.64 kg of the aqueous dispersion sol (CST-1) of fine particles of core-shell type inorganic oxide having a solid content concentration of 10% by weight, 0.64 kg of the aqueous dispersion sol (CST-9) of fine particles of core-shell type inorganic oxide having a solid content concentration of 10% by weight was used.

Preparation of Coating Composition (H9) for Forming Hardcoat Layer Film

A coating composition (H9) for forming a hardcoat layer film was prepared by the same method as in the preparation of the coating composition (H1) for forming a hardcoat layer film in Example 1 except that, in the step of preparing the coating composition (H1) for forming a hardcoat layer film in Example 1, instead of using 300.2 g of the methanol dispersion liquid (CST-1-M) of fine particles of core-shell type inorganic oxide, 314.3 g of the methanol dispersion liquid (CST-9-M) of core-shell composite oxide fine particles was used.

Comparative Example 1

Preparation of Aqueous Dispersion Sol (RC-1) of Inorganic Oxide Fine Particles

An aqueous dispersion sol (RC-1, 0.64 kg) of inorganic oxide fine particles having a solid content concentration of 10% by weight was prepared by using the aqueous dispersion sol (ST-1) of surface-treated metal oxide fine particles or fine particles of titanium-containing metal oxide having the (b) intermediate layer in Example 1 without covering the particles with silica or zirconium.

Thus-obtained aqueous dispersion sol containing metal oxide fine particles was a transparent milk-white sol.

The contents of metal components in the metal oxide fine particles were measured and the result in terms of oxide of each metal component was 82.6% by weight of $TiO_2$, 10.3% by weight of $SnO_2$, 4.9% by weight of $ZrO_2$, and 2.2% by weight of $K_2O$. The metal oxide fine particles had an average particle diameter of 18 nm, a specific surface area of 144 $m^2/g$, and a charge density of 1.95 $\mu eq/m^2$. The amount of solid acid was 0.180 mmol/g.

Of the measurement results, some data mainly relating to the present invention are described in Table 1.

Preparation of Methanol Dispersion Sol (RC-1-M) of Fine Particles of Core-Shell Type Inorganic Oxide A methanol dispersion sol (RC-1-M, 0.32 kg) of fine particles of core-shell type inorganic oxide having a solid content concentration of 20% by weight was prepared by the same method as in Example 1 except that, in the step of preparing the methanol dispersion sol (CST-1-M) of fine particles of core-shell type inorganic oxide in Example 1, instead of using 0.64 kg of the aqueous dispersion sol (CST-1) of fine particles of core-shell type inorganic oxide having a solid content concentration of 10% by weight, 0.64 kg of the aqueous dispersion sol (RC-1) of inorganic oxide fine particles having a solid content concentration of 10% by weight was used. The methanol dispersion sol (RC-1-M) gelated immediately after the preparation thereof.

Comparative Example 2

Preparation of Aqueous Dispersion Sol (R-2) of Non-surface-treated Metal Oxide Fine Particles An aqueous dispersion sol (R-2, 1.87 kg) of non-surface-treated metal oxide fine particles or fine particles of titanium-containing metal oxide having the (b) intermediate layer that had a solid content concentration of 10% by weight was prepared by the same method as in Example 1 except that, in the step of preparing the aqueous dispersion sol (ST-1) of surface-treated metal oxide fine particles or fine particles of titanium-containing metal oxide having the (b) intermediate layer in Example 1, 1.53 kg of the aqueous solution of zirconium oxychloride octahydrate was not added.

The fine particles contained in the aqueous dispersion sol of non-surface-treated metal oxide fine particles had a specific surface area of 153 $m^2/g$ and were constituted by rutile crystals having a crystallite diameter of 9.0 nm. The amount of solid acid was 0.180 mmol/g.

The contents of metal components in the non-surface-treated metal oxide fine particles were measured and the result in terms of oxide of each metal component was 88.2% by weight of $TiO_2$, 11.1% by weight of $SnO_2$, and 0.7% by weight of $K_2O$.

Preparation of Aqueous Dispersion Sol (RC-2) of Fine Particles of Core-Shell Type Inorganic Oxide The aqueous dispersion sol (RC-2, 0.64 kg) of fine particles of core-shell type inorganic oxide having a solid content concentration of 10% by weight was prepared by the same method as in Example 1 except that, in the step of preparing the aqueous dispersion sol (CST-1) of fine particles of core-shell type inorganic oxide in Example 1, instead of using 1.80 kg of the aqueous dispersion sol (ST-1) of surface-treated metal oxide fine particles or fine particles of titanium-containing metal oxide having the (b) intermediate layer having a solid content concentration of 10% by weight, 1.80 kg of the aqueous dispersion sol (R-2) of non-surface-treated metal oxide fine particles or fine particles of titanium-containing metal oxide having the (b) intermediate layer having a solid content concentration of 10% by weight was used.

Thus-obtained aqueous dispersion sol containing metal oxide fine particles was a transparent milk-white sol.

The contents of metal components in the metal oxide fine particles were measured and the result in terms of oxide of each metal component was 70.1% by weight of $TiO_2$, 8.8% by weight of $SnO_2$, 15.5% by weight of $SiO_2$, 3.87% by weight of $ZrO_2$, and 1.7% by weight of $K_2O$. The metal oxide fine particles had an average particle diameter of 19 nm, a specific surface area of 168 $m^2/g$, and a charge density of 0.80 µeq/$m^2$. The amount of solid acid was 0.065 mmol/g.

Of the measurement results, some data mainly relating to the present invention are described in Table 1.

Preparation of Methanol Dispersion Sol (RC-2-M) of Fine Particles of Core-Shell Type Inorganic Oxide A methanol dispersion sol (RC-2-M, 0.32 kg) of fine particles of core-shell type inorganic oxide having a solid content concentration of 20% by weight was prepared by the same method as in Example 1 except that, in the step of preparing the methanol dispersion sol (CST-1-M) of fine particles of core-shell type inorganic oxide in Example 1, instead of using 0.64 kg of the aqueous dispersion sol (CST-1) of fine particles of core-shell type inorganic oxide having a solid content concentration of 10% by weight, 0.64 kg of the aqueous dispersion sol (RC-2) of fine particles of core-shell type inorganic oxide having a solid content concentration of 10% by weight was used.

Preparation of Coating Composition (C2) for Forming Hardcoat Layer Film

A coating composition (C2) for forming a hardcoat layer film was prepared by the same method as in the preparation of the coating composition (H1) for forming a hardcoat layer film in Example 1 except that, in the step of preparing the coating composition (H1) for forming a hardcoat layer film in Example 1, instead of using 300.2 g of the methanol dispersion liquid (CST-1-M) of fine particles of core-shell type inorganic oxide, 298.6 g of the methanol dispersion liquid (RC-2-M) of core-shell composite oxide fine particles was used.

Preparation of Coating Composition (F) for Forming Hardcoat Layer Film

A coating composition (C5) for forming a hardcoat layer film was prepared by the same method as in the preparation of the coating composition (H10) for forming a hardcoat layer film in Example 1 except that, in the step of preparing the coating composition (H10) for forming a hardcoat layer film in Example 1, instead of using 333.4 g of the methanol dispersion liquid (CST-1-M) of fine particles of core-shell type inorganic oxide, 333.4 g of the methanol dispersion liquid (RC-2-M) of core-shell composite oxide fine particles was used.

Preparation of Coating Composition (Y2) for Forming Primer Layer Film

A coating composition (Y2) for forming a primer layer film was prepared by the same method as in the preparation of the coating composition (P1) for forming a primer layer film in Example 1 except that, in the step of preparing the coating composition (P1) for forming a primer layer film in Example 1, instead of using 206.7 g of the methanol dispersion liquid (CST-1-M) of fine particles of core-shell type inorganic oxide, 298.6 g of the methanol dispersion liquid (RC-2-M) of core-shell composite oxide fine particles was used.

Preparation of Coating Composition (Y3) for Forming Primer Layer Film

A coating composition (Y3) for forming a primer layer film was prepared by the same method as in the preparation of the coating composition (P2) for forming a primer layer film in Example 1 except that, in the step of preparing the coating composition (P2) for forming a primer layer film in Example 1, instead of using 229.5 g of the methanol dispersion liquid (CST-1-M) of fine particles of core-shell type inorganic oxide, 229.5 g of the methanol dispersion liquid (RC-2-M) of core-shell composite oxide fine particles was used.

Comparative Example 3

Preparation of Aqueous Dispersion Sol (R-3) of Non-Surface-Treated Metal Oxide Fine Particles An aqueous dispersion sol (R-3, 1.87 kg) of non-surface-treated metal oxide fine particles or fine particles of titanium-containing metal oxide not having the (b) intermediate layer that had a solid content concentration of 10% by weight was prepared by the same method as in Example 1 except that, in the step of preparing the aqueous dispersion sol (ST-5) of surface-treated metal oxide fine particles or fine particles of titanium-containing metal oxide having the (b) intermediate layer in Example 5, 1.53 kg of the aqueous solution of zirconium oxychloride octahydrate was not added.

The fine particles contained in the aqueous dispersion sol of non-surface-treated metal oxide fine particles had a specific surface area of 210 $m^2/g$ and were constituted by rutile crystals having a crystallite diameter of 7.1 nm. The amount of solid acid was 0.266 mmol/g.

The contents of metal components in the non-surface-treated metal oxide fine particles were measured and the result in terms of oxide of each metal component was 71.9% by weight of $TiO_2$, 9.1% by weight of $SnO_2$, 17.4% by weight of $SiO_2$, and 1.6% by weight of $K_2O$.

Preparation of Aqueous Dispersion Sol (RC-3) of Fine Particles of Core-shell Type Inorganic Oxide The aqueous dispersion sol (RC-3, 0.64 kg) of fine particles of core-shell type inorganic oxide having a solid content concentration of 10% by weight was prepared by the same method as in Example 1 except that, in the step of preparing the aqueous dispersion sol (CST-1) of fine particles of core-shell type inorganic oxide in Example 1, instead of using 1.80 kg of the aqueous dispersion sol (ST-1) of surface-treated metal oxide fine particles or fine particles of titanium-containing metal oxide having the (b) intermediate layer having a solid content concentration of 10% by weight, 1.80 kg of the aqueous dispersion sol (R-3) of non-surface-treated metal oxide fine particles or fine particles of titanium-containing metal oxide not having the (b) intermediate layer having a solid content concentration of 10% by weight was used.

Thus-obtained aqueous dispersion sol containing metal oxide fine particles was a transparent milk-white sol.

The contents of metal components in the metal oxide fine particles were measured and the result in terms of oxide of each metal component was 57.1% by weight of $TiO_2$, 7.3% by weight of $SnO_2$, 26.9% by weight of $SiO_2$, 4.69% by weight of $ZrO_2$, and 4.0% by weight of $K_2O$. The metal oxide fine particles had an average particle diameter of 14 nm, a specific surface area of 218 $m^2/g$, and a charge density of 0.80 $\mu eq/m^2$. The amount of solid acid was 0.089 mmol/g.

Of the measurement results, some data mainly relating to the present invention are described in Table 1.

Preparation of Methanol Dispersion Sol (RC-3-M) of Fine Particles of Core-Shell Type Inorganic Oxide A methanol dispersion sol (RC-3-M, 0.32 kg) of fine particles of core-shell type inorganic oxide having a solid content concentration of 20% by weight was prepared by the same method as in Example 1 except that, in the step of preparing the methanol dispersion sol (CST-1-M) of fine particles of core-shell type inorganic oxide in Example 1, instead of using 0.64 kg of the aqueous dispersion sol (CST-1) of fine particles of core-shell type inorganic oxide having a solid content concentration of 10% by weight, 0.64 kg of the aqueous dispersion sol (RC-3) of fine particles of core-shell type inorganic oxide having a solid content concentration of 10% by weight was used.

Preparation of Coating Composition (C3) for Forming Hardcoat Layer Film

A coating composition (C3) for forming a hardcoat layer film was prepared by the same method as in the preparation of the coating composition (H1) for forming a hardcoat layer film in Example 1 except that, in the step of preparing the coating composition (H1) for forming a hardcoat layer film in Example 1, instead of 300.2 g of the methanol dispersion liquid (CST-1-M) of fine particles of core-shell type inorganic oxide, 314.6 g of the methanol dispersion liquid (RC-3-M) of core-shell composite oxide fine particles was used.

Example 10

Preparation of Plastic Lens Test Bases (Specimens)
(1) Pretreatment of Plastic Lens Commercially available plastic lens base materials, "monomer name: MR-7" (manufactured by Mitsui Chemicals, Inc.; refractive index of base material: 1.67) and "monomer name: MR-174" (manufactured by Mitsui Chemicals, Inc.; refractive index of base material: 1.74), were etched by being immersed in a 10% by weight KOH aqueous solution maintained at 40° C. for 2 minutes, withdrawn from the solution, washed, and then sufficiently dried.
(2) Formation of Primer Layer Films The plastic lens base materials having been pretreated were coated with coating compositions for forming primer layer films to form coating films. This coating with the coating compositions was performed by dipping (withdrawal rate: 120 mm/min).

Predrying of the coating films (primer layers) was performed by heating the coating films at 100° C. for 10 minutes.

Thus-precured primer layers had a thickness of about 0.5 to 0.7 μm.
(3) Formation of Hardcoat Layer Films The plastic lens base materials that were pretreated and had primer layer films were coated with coating compositions for forming hardcoat layer films to form coating films. This coating with the coating compositions was performed by dipping (withdrawal rate: 250 mm/min).

The coating films were subsequently dried at 90° C. for 10 minutes and then heated at 110° C. for 2 hours to cure the coating films (hardcoat layers). At this time, curing of the primer layers was also performed.

Thus-cured hardcoat layer films had a thickness of about 3.0 to 3.5 μm.
(4) Formation of Antireflective Layer Films Inorganic oxide components were deposited onto the surface of the hardcoat layer film by vacuum deposition so as to have the following configuration: An antireflective layer film constituted by layers of $SiO_2$: 0.06λ, $ZrO_2$: 0.15λ, $SiO_2$: 0.04λ, $ZrO_2$: 0.25λ, and $SiO_2$: 0.25λ that were stacked in this order from the hardcoat layer side to the air side; and the design wavelength λ, was 520 nm.

Evaluation of Appearance, Resistance to Scratching, Adhesion, and Weather Resistance Specimen Nos. 1 to 11 were prepared by forming primer layer films and hardcoat layer films on plastic lens base materials having been pretreated in accordance with combinations in Table 2, by using the coating compositions H1, H2, H3, H4, H5, H6, H7, H8, H9, C2, and C3 for forming hardcoat layer films and the coating compositions P1 and Y2 for forming primer layer films obtained in Examples 1 to 9 and Comparative examples 2 and 3.

In addition, Specimen No. 12 was prepared in which the coating composition P1 for forming a primer layer film and the coating composition H1 for forming a hardcoat layer film were applied and the antireflective layer film was formed; and Specimen No. 13 was prepared in which the coating composition Y2 for forming a primer layer film and the coating composition C2 for forming a hardcoat layer film were applied and the antireflective layer film was formed.

As for the base material of Specimen No. 14 in which the coating composition P2 for forming a primer layer film and the coating composition H10 for forming a hardcoat layer film were applied and the antireflective layer film was formed, and the base material of Specimen No. 15 in which the coating composition Y3 for forming a primer layer film and the coating composition C5 for forming a hardcoat layer film were applied and the antireflective layer film was formed, "monomer name: MR-174" (manufactured by Mitsui Chemicals, Inc.; refractive index of base material: 1.74) was used. For the base materials of the other specimens, "monomer name: MR-7" (manufactured by Mitsui Chemicals, Inc.; refractive index of base material: 1.67) was used.

Thus-obtained Specimen Nos. 1 to 15 were tested and evaluated by the above-described evaluation test methods in terms of appearance (interference fringes), appearance (cloudiness), resistance to scratching, film hardness, adhesion, weather resistance, and light resistance. The results are described in Table 3.

As is clear from the results, it has been demonstrated that specimens obtained by applying coating compositions prepared in Examples have relatively high resistance to scratching, high transparency without cloudiness, high adhesion, high weather resistance, and high light resistance.

TABLE 1

| | Properties of core-shell particles | | | | | |
|---|---|---|---|---|---|---|
| | | Surface treatment | | | Surface negative | Solid |
| | Core particles Composition | Metal | Treatment amount (% by mol) | Shell Composition | charge density ($\mu eq/m^2$) | acid amount (mmol/g) |
| Example 1 | Ti—Sn—K | Zr | 5 | Si—Zr | 1.37 | 0.034 |
| Example 2 | Ti—Sn—K | Zr | 1 | Si—Zr | 1.29 | 0.028 |
| Example 3 | Ti—Sn—K | Zr | 10 | Si—Zr | 1.48 | 0.029 |
| Example 4 | Ti—Sn—K | Sn | 5 | Si—Zr | 1.11 | 0.009 |
| Example 5 | Ti—Sn—K—Si | Zr | 5 | Si—Zr | 1.17 | 0.021 |
| Example 6 | Ti—Sn—K | Zr | 5 | Si—Al | 1.37 | 0.034 |
| Example 7 | Ti—Sn—K—Si | Sn | 5 | Si—Zr | 1.20 | 0.007 |
| Example 8 | Ti—Sn—K—Si | Sn | 10 | Si—Zr | 1.22 | 0.006 |
| Example 9 | Ti—Sn—K—Si | Sn | 5 | Si—Al | 1.22 | 0.008 |
| Comparative example 1 | Ti—Sn—K | Zr | 5 | — | 1.95 | 0.18 |
| Comparative example 2 | Ti—Sn—K | — | — | Si—Zr | 0.80 | 0.065 |
| Comparative example 3 | Ti—Sn—K—Si | — | — | Si—Zr | 0.80 | 0.089 |

TABLE 2

| Specimen No | Base material | Hardcoat coating composition | | Primer coating composition | | Presence or absence of anti-reflective film |
|---|---|---|---|---|---|---|
| | | Example coating composition | Comparative example coating composition | Example coating composition | Comparative example coating composition | |
| 1 | 1.67 | H1 | — | P1 | — | Absent |
| 2 | 1.67 | H2 | — | P1 | — | Absent |
| 3 | 1.67 | H3 | — | P1 | — | Absent |
| 4 | 1.67 | H4 | — | P1 | — | Absent |
| 5 | 1.67 | H5 | — | P1 | — | Absent |
| 6 | 1.67 | H6 | — | P1 | — | Absent |
| 7 | 1.67 | H7 | — | P1 | — | Absent |
| 8 | 1.67 | H8 | — | P1 | — | Absent |
| 9 | 1.67 | H9 | — | P1 | — | Absent |
| 10 | 1.67 | — | C2 | — | Y2 | Absent |
| 11 | 1.67 | — | C3 | — | Y2 | Absent |
| 12 | 1.67 | H1 | — | P1 | — | Present |
| 13 | 1.67 | — | C2 | — | Y2 | Present |
| 14 | 1.74 | H10 | — | P2 | — | Present |
| 15 | 1.74 | — | C5 | — | Y3 | Present |

TABLE 3

| Specimen No | Appearance (interference fringes) | Appearance (cloudiness) | Resistance to scratching | Film hardness | Adhesion | Weather resistance | Light resistance |
|---|---|---|---|---|---|---|---|
| 1 | S | A | B | 2.3 | Good | Good | Good |
| 2 | S | A | B | 2.1 | Good | Good | Good |
| 3 | S | A | B | 2.6 | Good | Good | Good |
| 4 | S | A | B | 2.3 | Good | Good | Good |
| 5 | A | A | B | 2.1 | Good | Good | Good |
| 6 | S | A | B | 3.0 | Good | Good | Good |
| 7 | A | A | B | 2.1 | Good | Good | Good |
| 8 | A | A | B | 2.1 | Good | Good | Good |
| 9 | A | A | B | 2.9 | Good | Good | Good |
| 10 | S | A | B | 1.9 | Good | Poor | Good |
| 11 | A | A | B | 1.8 | Good | Poor | Good |
| 12 | S | A | A | 7.1 | Good | Good | Good |
| 13 | S | A | A | 5.4 | Good | Poor | Poor |
| 14 | S | A | A | 6.2 | Good | Good | Good |
| 15 | S | A | A | 4.3 | Good | Poor | Poor |

The invention claimed is:

1. A dispersion liquid comprising fine particles of core-shell inorganic oxide, the fine particles of core-shell inorganic oxide consisting of:
    (a) core particles of titanium-containing metal oxide;
    (b) an intermediate layer formed on a surface of each of the core particles, said intermediate layer consists of a hydrate and/or an oxide selected from a metal element selected from the group consisting of zirconium, tin, niobium, barium, lanthanum, strontium, cerium, and lithium, wherein, an amount of the hydrate and/or the oxide of the metal element in the intermediate layer on a molar basis is in a range of 0.1 to 20% by mole, to a total amount of the titanium-containing metal oxide in the core particles; and
    (c) a shell layer formed on a surface of said intermediate layer formed on each of the core particles, said shell layer containing a composite oxide of silicon and at least one metal element selected from the group consisting of aluminum, zirconium, and antimony,
    wherein said shell layer contains an amount of the composite oxide in a range of 5 to 100 parts by weight per 100 parts by weight of the core particles of the titanium-containing metal oxide, and
    wherein the fine particles of core-shell inorganic oxide contained in the dispersion liquid with a pH of 6 have a surface negative charge density in a range of 1.20 to 1.50 µeq/m².

2. The dispersion liquid according to claim 1, wherein the core particles of the titanium-containing metal oxide contain titanium in a range of 50 to 100% by weight in terms of $TiO_2$.

3. The dispersion liquid according to claim 1, wherein the core particles of the titanium-containing metal oxide contain a composite oxide of titanium and at least one metal element selected from the group consisting of tin, silicon, and zirconium.

4. The dispersion liquid according to claim 1, wherein the titanium-containing metal oxide has a crystalline structure.

5. The dispersion liquid according to claim 1, wherein the hydrate and/or the oxide of the metal element formed on the core particles of the titanium-containing metal oxide has an amorphous structure.

6. The dispersion liquid according to claim 1, wherein the fine particles further consist of an amount of solid acid on a surface of each of the core particles of the core-shell inorganic oxide in a range of 0.001 to 0.15 mmol/g.

7. The dispersion liquid according to claim 6, wherein the amount of solid acid on the surface of the fine particles of core-shell inorganic oxide is in the range of from 0.006 to 0.034 mmol/g.

8. The dispersion liquid according to claim 1, wherein the core particles of the core-shell inorganic oxide have an average particle diameter in a range of 8 to 60 nm.

9. The dispersion liquid according to claim 1, further comprising a dispersion medium for the dispersion liquid, the dispersion medium being water and/or at least one organic compound selected from alcohols, esters, or ketones.

10. A method for producing the dispersion liquid of claim 1, the method comprising:
    (1) a step of preparing an aqueous dispersion liquid of core particles of titanium-containing metal oxide with an intermediate layer formed on a surface of each core particle by adding a metal salt or a metal alkoxide of at least one metal element selected from the group consisting of zirconium, tin, niobium, barium, lanthanum, strontium, cerium, and lithium to an aqueous dispersion liquid containing the fine particles of the titanium-containing metal oxide having an average particle diameter in a range of 5 to 50 nm to provide a mixture under such a condition that an amount of the metal element on a molar basis in terms of oxide in the intermediate layer is in a range of 0.1 to 20% by mole, to a total amount of the titanium-containing metal oxide in the core particles;
    (2) a step of adding a silicon compound and a compound of at least one metal element selected from aluminum, zirconium, and antimony to the aqueous dispersion liquid of the fine particles of titanium-containing metal oxide with (b) the intermediate layer thereon prepared by the step (1) to provide a dispersion liquid of fine particles of titanium-containing metal oxide having (c) a composite oxide shell layer on the surface of (b) the intermediate layer; and
    (3) a step of heating the dispersion liquid obtained by the step (2) at 60° C. to 250° C. for 0.5 to 20 hours, wherein said shell layer contains an amount of the composite oxide in a range of 5 to 100 parts by weight per 100 parts by weight of the core particles of the titanium-containing metal oxide, and wherein the fine particles of core-shell inorganic oxide contained in the dispersion liquid with a pH of 6 have a surface negative charge density in a range of 1.20 to 1.50 µeq/m².

11. The method for producing a dispersion liquid containing core-shell inorganic oxide fine particles according to claim 10, the method further comprising: after the step (1),
(1. 1) a step of drying the aqueous dispersion liquid prepared by the step (1) to provide a dried powder;
(1. 2) a step of sintering the dried powder obtained by the step (1. 1) at a temperature of 300° C. to 800° C. to provide a sintered powder of the fine particles of the titanium-containing metal oxide with (b) an intermediate layer thereon; and
(1. 3) a step of dispersing the sintered powder obtained by the step (1. 2) back in water.

12. The method for producing a dispersion liquid containing core-shell inorganic oxide fine particles according to claim 10, wherein, in the step (1), the aqueous dispersion liquid containing the fine particles of the core-shell type inorganic oxide is kept at a pH in a range of 5 to 11, with an addition of a metal salt or a metal alkoxide of at least one metal element thereto.

13. A coating composition for forming a film, comprising:
(1) fine particles of the core-shell type inorganic oxide according to claim 1 and
(2) a binder component represented by a general formula (I) below;

where $R^1$ represents an alkyl group having 1 to 6 carbon atoms, an organic group containing a vinyl group and having 8 or less carbon atoms, an organic group containing an epoxy group and having 8 or less carbon atoms, an organic group containing a methacryloxy group and having 8 or less carbon atoms, an organic group containing a mercapto group and having 1 to 5 carbon atoms, or an organic group containing an amino group and having 1 to 5 carbon atoms; $R^2$ represents an alkyl group having 1 to 3 carbon atoms, an alkylene group having 1 to 3 carbon atoms, a cycloalkyl group, a halogenated alkyl group, or an allyl group; $R^3$ represents an alkyl group having 1 to 3 carbon atoms, an alkylene group having 1 to 3 carbon atoms, or a cycloalkyl group; "a" represents an integer of 0 or 1; and "b" represents an integer of 0, 1, or 2.

14. The coating composition for forming a film according to claim 13, wherein the coating composition is a coating composition for an optical base material.

15. A coating composition for forming a film, comprising:
(1) fine particles of the core-shell type inorganic oxide according to claim 1 and
(2) at least one binder component selected from the group consisting of a thermosetting organic resin, a thermoplastic organic resin, and an ultraviolet curable organic resin.

16. A coating composition for forming a film, comprising:
(1) fine particles of the core-shell type inorganic oxide according to claim 1 and
(2) a binder component represented by a general formula (I) below;

where $R^1$ represents an alkyl group having 1 to 6 carbon atoms, an organic group containing a vinyl group and having 8 or less carbon atoms, an organic group containing an epoxy group and having 8 or less carbon atoms, an organic group containing a methacryloxy group and having 8 or less carbon atoms, an organic group containing a mercapto group and having 1 to 5 carbon atoms, or an organic group containing an amino group and having 1 to 5 carbon atoms; $R^2$ represents an alkyl group having 1 to 3 carbon atoms, an alkylene group having 1 to 3 carbon atoms, a cycloalkyl group, a halogenated alkyl group, or an allyl group; $R^3$ represents an alkyl group having 1 to 3 carbon atoms, an alkylene group having 1 to 3 carbon atoms, or a cycloalkyl group; "a" represents an integer of 0 or 1; and "b" represents an integer of 0, 1, or 2.

17. The dispersion liquid according to claim 1, wherein the dispersion liquid further comprises a dispersion medium comprising at least one organic compound selected from one or more of the following compounds: methanol, ethanol, butanol, propanol, isopropyl alcohol, ethylene glycol monomethyl ether, propylene glycol monomethyl ether, propylene glycol monoethyl ether, methyl ethyl ketone, or γ-butyrolactone.

* * * * *

UNITED STATES PATENT AND TRADEMARK OFFICE
CERTIFICATE OF CORRECTION

PATENT NO. : 9,834,450 B2  
APPLICATION NO. : 13/228132  
DATED : December 5, 2017  
INVENTOR(S) : Yoichi Ishihara et al.

Page 1 of 1

It is certified that error appears in the above-identified patent and that said Letters Patent is hereby corrected as shown below:

Column 43, Line 31, Claim 13, delete "$R^1{}_a R^2{}_b Si(OR^{3)}{}_{4-(a+b)}$" and insert -- $R^1{}_a R^2{}_b Si(OR^3)_{4-(a+b)}$ --

Column 44, Line 18, Claim 16, delete "$R^1{}_a R^2{}_b Si(OR^{3)}{}_{4-(a+b)}$" and insert -- $R^1{}_a R^2{}_b Si(OR^3)_{4-(a+b)}$ --

Signed and Sealed this  
Third Day of July, 2018

Andrei Iancu  
*Director of the United States Patent and Trademark Office*